United States Patent
Speece

(10) Patent No.: US 7,163,632 B1
(45) Date of Patent: Jan. 16, 2007

(54) SYSTEM AND METHOD FOR OXYGENATION FOR WASTEWATER TREATMENT

(76) Inventor: Richard E. Speece, 5840 Robert E. Lee Dr., Nashville, TN (US) 37215

( * ) Notice: Subject to any disclaimer, the term of this patent is extended or adjusted under 35 U.S.C. 154(b) by 0 days.

(21) Appl. No.: 11/342,726

(22) Filed: Jan. 30, 2006

(51) Int. Cl.
*B01F 3/04* (2006.01)
*C02F 3/02* (2006.01)

(52) U.S. Cl. .................. 210/621; 210/629; 210/205; 210/221.2; 210/259; 261/77

(58) Field of Classification Search .............. 210/620, 210/621, 623, 629, 205, 207, 221.1, 221.2, 210/252, 259; 261/75, 77
See application file for complete search history.

(56) References Cited

U.S. PATENT DOCUMENTS

| | | | |
|---|---|---|---|
| 3,926,588 A * | 12/1975 | Speece | 261/77 |
| 4,069,147 A | 1/1978 | Abrams et al. | |
| 4,094,774 A | 6/1978 | Smith | |
| 4,171,263 A * | 10/1979 | Roberts et al. | 210/621 |
| 4,192,742 A | 3/1980 | Bernard et al. | |
| 4,251,365 A | 2/1981 | Speece | |
| 4,256,574 A | 3/1981 | Bhargava | |
| 4,452,701 A | 6/1984 | Garrett et al. | |
| 4,460,470 A | 7/1984 | Reimann | |
| 4,735,750 A * | 4/1988 | Damann | 261/29 |
| 5,447,630 A | 9/1995 | Rummler | |
| 5,463,176 A | 10/1995 | Eckert | |
| 5,496,469 A | 3/1996 | Scraggs et al. | |
| 5,538,635 A | 7/1996 | Mazewski et al. | |
| 6,024,877 A | 2/2000 | Bonnet et al. | |
| 6,093,316 A | 7/2000 | Cormier | |
| 6,474,627 B1 | 11/2002 | Speece | |
| 6,485,003 B1 | 11/2002 | Speece | |
| 6,668,556 B1 | 12/2003 | Speece | |
| 6,752,926 B1 | 6/2004 | Christodoulatos et al. | |
| 6,830,690 B1 * | 12/2004 | Schmid | 210/609 |
| 6,848,258 B1 | 2/2005 | Speece | |
| 7,008,535 B1 * | 3/2006 | Spears et al. | 210/220 |
| 2005/0279688 A1 * | 12/2005 | Hsu | 210/192 |

FOREIGN PATENT DOCUMENTS

| | | | |
|---|---|---|---|
| DE | 3703560 | * | 8/1987 |
| JP | 9-192687 | * | 7/1997 |
| JP | P2003-164890 | * | 6/2003 |
| WO | WO 91/00418 | | 12/1991 |

* cited by examiner

*Primary Examiner*—Fred G. Prince
(74) *Attorney, Agent, or Firm*—Ice Miller LLP; Doreen J. Gridley; Natalie J. Tanner

(57) ABSTRACT

A fluid treatment system and method for dissolving a gas into a fluid and subsequently allowing microbial or chemical reactions with the fluid mixture to decontaminate the fluid. The system comprises a pressurized gas transfer reactor, a depressurization device, a means of rapid dilution, a reactor, and a means of secondary clarification. Gas is dissolved into a fluid within the pressurized gas transfer reactor. The fluid is then transferred to the depressurization device where it is depressurized and diluted. Thereafter, or concurrently, the fluid flows into the reactor where microbes consume contaminants and dissolved gas within the fluid. The decontaminated fluid then either flows into a secondary clarification tank or membrane system where the bacteria within the decontaminated fluid are removed, or the fluid is recycled through the system. The method of present invention utilizes the system of present invention and operates pumps and a regenerative turbine or throttling valve.

64 Claims, 6 Drawing Sheets

SYSTEM AND METHOD FOR OXYGENATION FOR WASTEWATER TREATMENT

BACKGROUND OF INVENTION

In the wastewater treatment industry, it is known to remove impurities from sewage using a microbial oxidative digestion process. During this process, the action of certain bacteria and microorganisms can decompose or digest biodegradable compounds (commonly referred to as BOD) located in sewage into non-harmful compounds. These organisms are aerobic in nature and require oxygen to function and survive; thus, a sufficient amount of dissolved oxygen (D.O.) must be present in the sewage to sustain their life processes.

Sewage, in particular, has increased organic water pollution which correspondingly supports a high microbial population. For example, domestic wastewater commonly has BOD concentrations in the range of 100 to 300 mg/L as compared to the acceptable BOD concentration of a natural body of water of less than 9.0 mg/L. Due to this increased BOD concentration, a much higher microbial oxygen demand is created in sewage that cannot be satisfied by natural oxygen aeration processes. If the D.O. demand is not met, hydrogen sulfide (an odorous gas) creation readily occurs and microbial organic breakdown is limited. Therefore, it is known by those skilled in the art to artificially oxygenate the sewage to promote the activity of the aerobic microorganisms located therein.

The desire to increase D.O. levels is not limited to wastewater treatment applications. It is also applicable to slow moving bodies of water (such as the waterways of Chicago, Ill.) and other fluids. Insufficient D.O. levels in rivers, streams, and canals in which treated wastewaters are discharged can compel entire industries to curtail production to considerable economic detriment. Low D.O. levels also can result in harm to the local ecosystem as fish and submarine flora require D.O. to function. Moreover, systems for dissolving a gas into a fluid are not limited to dissolving oxygen in water. Other gas/fluid combinations include: hydrogenation of vegetable oils, coal liquification, yeast production, Vitamin C production, pharmaceutical and industrial aerobic bioprocesses, chemical oxidation of sulfide, and other processes well known in the art.

The activated sludge process employs the above concept and is the most commonly used biological treatment method. Conventionally, the wastewater is pumped into an aeration tank where it is infused with oxygen from the air, thereby adding dissolved oxygen (D.O.) into the wastewater. Introduction of air into the sewage intimately mixes the organic components of the sewage with the bacteria populations in the aerator chamber, creating an activated sludge. By aerating the wastewater, the environmental conditions in the aeration tank are maintained so as to promote the optimal growth of microorganisms and, thus, achieve maximum BOD removal. In conventional activated sludge systems, D.O. is supplied by either bubbling air through diffusers in the bottom of the aeration tank (submerged diffusers) or splashing the water in contact with the air (surface aerators). An enormous amount of air has to be supplied to such systems to satisfy the bacterial oxygen requirements.

It is well known that pressure and an increased oxygen composition of the gas greatly enhances the dissolving of oxygen into a liquid, including, but not limited to, dissolving air or high purity oxygen (HPO) into water. Therefore, it is commonly known to those skilled in the art to pressurize the oxygen transfer reactor in order to increase D.O. dissolution. For instance, with 100% oxygen gas and a pressurization of 12 atmospheres in the gas transfer reactor, it is possible to increase the D.O. concentration of sewage to over 500 mg/L. Moreover, using a pressurized oxygen transfer reactor does not significantly increase the energy requirements of the system. It can be shown that the unit energy consumption (kwhr/ton of gas dissolved) in a pressurized gas transfer system is constant as the pressure within the oxygen transfer reactor and amount of dissolved gas in the fluid discharge increases. However, it is difficult to maintain the high D.O. concentration within the fluid because once the supersaturated fluid is no longer under the increased pressure of the gas transfer reactor, effervescence readily occurs. Therefore, due to the loss of D.O. through effervescence, the high energy expenditure that is required to dissolve the large amounts of oxygen into the fluid is all but wasted.

In the reactor/aeration tank of prior art systems, microorganisms are suspended and the contents are subjected to a turbulent regime to maintain the suspension. If the bacteria settle, the organic components are not as accessible and are less likely to be metabolized by the bacteria. Generally, wastewater containing suspended and dissolved organics is introduced at the inlet end where it is mixed with the returned sludge and discharged into the tank. The tank contents, including wastewater, returned sludge, and suspended biological floc, are known as mixed liquor. The mixed liquor is continuously withdrawn from the tank and residence time in the tank is varied to achieve the desired treatment efficiency. In conventional systems, the required D.O. is typically added over a 2 to 8 hour residence time in the aeration tank.

Once the sewage has been treated sufficiently, i.e., when the bacteria have broken down a target amount of organic components in the solution, the mixed liquor is discharged into a secondary clarification chamber where the biological solids settle down to form sludge, and the clarified water overflows over the effluent barrier. A portion of the sludge is recirculated to the aeration tank to maintain a steady concentration of BOD removing microorganisms in the tank and any excess sludge is wasted. One disadvantage of oxygenating a recirculating side-stream of recycled mixed liquor in a pressurized gas transfer reactor is that the microbial consortium contained therein is subject to intense shear by the hydraulic turbulence in the depressurization zone (the microbial reactor/aeration tank being pressurized versus the non-pressurized oxygen transfer chamber). This can adversely affect microbial flocculation or solids retention within the system used to maintain the bacteria or biomass within the reactor.

The key to consistent, efficient, and reliable sewage treatment is assuring that the proper amount of D.O. is introduced into the sewage for reaction with the microorganisms or bacteria. Even employing this aeration technique, it is common for oxygen transfer to limit the overall process. This is especially true considering the prospect of utilizing immobilized biomass carriers or membrane retention for the purpose of greatly increasing the amount of microorganisms, or biomass, present in the biological reactor. Given that domestic wastewater commonly has BOD concentrations in the range of 100 to 300 mg/L, this BOD concentration level is nominally the concentration of D.O. that must be supplied, depending on the solid retention time used in the process. Under conventional conditions utilizing aeration, the requisite D.O. demand is added to the wastewater over 4 to 8 hours of residence time in the aeration tank. This residence time coincides with the time it takes for the bacteria to metabolize the BOD. Thus, if 300 mg/L of D.O. is to be dissolved over a 6 hour period of time, this amounts to slightly less than 1 mg/L-min.—a relatively slow rate of D.O. addition to the system.

Conventionally, the concentration of microorganisms in the aeration tank is 1,000 to 3,000 mg/L and their D.O. uptake rate is relatively low; comparable to 1 to 2 mg/L-min. Using conventional aeration, the saturation concentration of D.O. in contact with air is about 9 mg/L. However, it is desired to maintain the D.O. in contact with the bacteria at 1 to 2 mg/L, which is adequate to sustain unrestricted bacterial metabolic rates. The rate of gas transfer, dc/dt, is related to a number of factors as shown in the gas transfer equation:

$$dc/dt = K_1(A/V)(C_{sat} - C_{act})$$

where $K_1$ is the oxygen transfer coefficient

A is the interfacial area of gas exposed to the water

V is the volume of the water $C_{sat}$ is the saturation concentration of D.O. in contact with gas $C_{act}$ is the actual concentration of D.O. in the water $(C_{sat} - C_{act})$ is the D.O. deficit driving force concentration Under conventional activated sludge operation, the D.O. deficit is 9–2 mg/L=7 mg/L. If the D.O. concentration maintained in the wastewater is higher than 2 mg/L, the D.O. deficit driving force concentration decreases and thus the rate of oxygen transfer decreases, resulting in increased unit energy consumption per unit of D.O. dissolved. In other words, these systems are most efficient when the D.O. concentration in the water is low, and are progressively more inefficient as the water D.O. level approaches saturation. For this reason, in conventional aeration systems the D.O. in the wastewater is maintained at the lowest D.O. concentration that does not restrict the rate of metabolic activity by the bacteria. Thus, conventional aeration systems allow for only limited D.O. increments in an effort to keep the system from being cost prohibitive.

Conventional aeration systems also do not provide a means to maintain adequate D.O. concentrations required for optimal BOD removal in the newer technologies that allow for a higher concentration of bacteria (MLSS) to be maintained in the reactor. At low food-to-microorganism (F/M) loading rates of 0.1 to 0.2 lb BOD/lb MLSS-day, only about 1 mg/L of D.O. is necessary to allow unrestricted bacterial metabolic activity. However, as the loading rate to the reactor increases, the D.O. in the bulk liquid must increase to prevent the formation of a bulking sludge, i.e., poor settling qualities of the sludge that hinder retention of the bacteria in the secondary clarification process. For example, at high BOD/MLSS loading rates of F/M=1.0 or higher, it may be necessary to maintain 6 mg/L D.O. in the wastewater to prevent bulking. Pursuant to the gas transfer equation, this reduces the D.O. deficit driving force to 9–6=3 mg/L D.O., which more than doubles the unit energy consumption per unit of D.O. dissolved in the sewage solution.

Newer biological processes are able to considerably increase the concentration of biomass maintained in the activated sludge reactor. These processes operate at a high F/M loading rate of 0.5 to 1.0 lb BOD/lb MLSS-day. While the conventional aeration processes are only able to meet D.O. uptake rates of about 100 mg/L-hr, newer aerobic biological treatment processes with higher MLSS rates and higher F/M organic loading rates have D.O. uptake rates in excess of 200–400 mg/L-hr that can require D.O. concentrations above 4 mg/L. Therefore, in addition to the high energy costs and the high probability of D.O. loss through effervescence, there are other disadvantages and shortcomings of conventional aeration systems. These shortcomings include: (a) low achievable D.O. concentrations due to the rate of oxygen transfer when using air as the oxygen source and the corresponding energy required to dissolve oxygen in the absence of a large pressure gradient with the low (21%) oxygen composition in air; (b) long time periods when the mixed liquor sits in the microbial reactor tank; (c) floc shear; (d) high energy dissipation in the reactor; and (e) limited D.O. supply potential.

In an attempt to alleviate some of these shortcomings, high purity oxygen (HPO) has been used as an oxygen source. However, infusing high purity oxygen into wastewater is typically only able to maintain a D.O. of less than 10 mg/L in contact with the bacteria, as nitrogen and carbon dioxide stripping from the activated sludge dilutes the oxygen composition therein. Moreover, the most common high purity oxygen application requires that the biological reactor be fitted with an expensive gas-tight cover as opposed to the open-topped tanks used conventionally.

Overall, it is desirable to develop an oxygenation system for dissolving a gas into a fluid which: (a) has a low capital cost; (b) has a low unit energy consumption (kwhr/ton of gas dissolved); (c) discharges high D.O. concentrations; (d) has a high oxygen absorption efficiency; and (e) utilizes an open-topped tank for the reactor. Ideally, the system should be capable of producing D.O. concentrations in the activated sludge capable of sustaining optimal bacterial metabolism and have an oxygen absorption efficiency of at least 80%, all accomplished with reasonable capital costs, a low unit operating cost, and energy efficiency.

SUMMARY OF THE INVENTION

Figure 1:
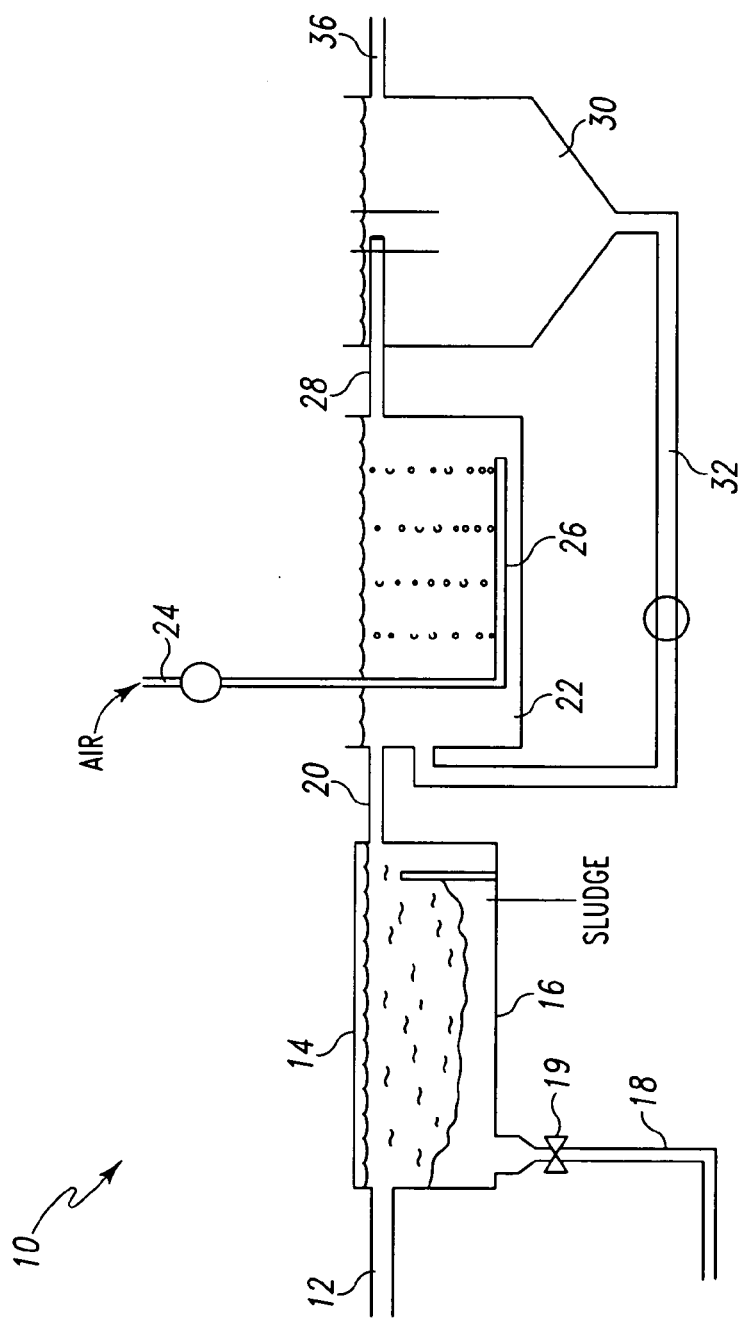
FIG. 1 shows a schematic diagram of one embodiment of a fluid treatment system of the PRIOR ART

The present invention is a fluid treatment system and method that employs the dissolution of a gas into a fluid and removes contaminants from the fluid. For example, the present invention may be used as a wastewater treatment system, i.e. dissolving oxygen into wastewater.

Generally, the system includes a pressurized gas transfer reactor, a depressurization shaft, a reactor, a secondary clarification tank, a fluid inlet, at least two pumps, and a regenerative turbine and/or throttling valve. In one embodiment, the fluid inlet is connected to the inlet of the pressurized gas transfer reactor. The fluid inlet receives the untreated fluid containing contaminants. The pressurized gas transfer reactor comprises a gas-tight chamber with a fluid inlet, a gas inlet, and a fluid outlet. The fluid inlet of the pressurized gas transfer reactor allows for the transfer of the untreated fluid into the pressurized gas transfer reactor. The first pump may be operatively connected to the pressurized gas transfer reactor inlet and acts to both pressurize and move the untreated fluid into the pressurized gas transfer reactor. The gas inlet of the pressurized gas transfer reactor allows for gas to be introduced into the interior of the pressurized gas transfer reactor. The fluid outlet of the pressurized gas transfer reactor is connected to the pressurized gas transfer reactor and communicates with the first inlet of the depressurization shaft.

The depressurization shaft is comprised of two ends, includes two inlets, and is operatively connected to the pressurized gas transfer reactor and the reactor. The first end of the depressurization shaft is positioned level with the bottom of the reactor. The second end of the depressurization shaft is positioned below the reactor. The positioning of the second end of the depressurization shaft relative to the other components of the system is to ensure an adequate amount of hydrostatic pressure is maintained therein. The two inlets of the depressurization shaft are positioned within the second end of the depressurization shaft. The two lines communicating with the two inlets of the depressurization shaft enter the depressurization shaft at the first end of the depressurization shaft. The first inlet of the depressurization shaft accepts fluid having a high dissolved gas concentration from the outlet of the pressurized gas transfer reactor. A regenerative turbine or a throttling valve may be connected to the first inlet of the depressurization shaft and acts to maintain the desired back pressure within the pressurized gas transfer reactor. The second inlet of the depressurization shaft accepts mixed liquor having a low dissolved gas concentration from the first outlet of the reactor. The depressurization shaft outlet is operatively connected to the reactor of the system. The depressurization shaft may or may not contain a carrier surface to facilitate growth of a biofilm.

The reactor of the system of the present invention has a first inlet, a first outlet, and a second outlet. It is also within the scope of this embodiment that the reactor may have a second inlet. The first inlet of the reactor is effectively connected to the outlet of the depressurization shaft. The first outlet of the reactor communicates with the second inlet of the depressurization shaft. The second pump of the present invention may be operatively connected to the first outlet of the reactor or the first inlet of the depressurization shaft and may act to move the liquid housed in the reactor into the second end of the depressurization shaft via the second inlet of the depressurization shaft. The second outlet of the reactor communicates with a secondary clarification tank or membrane system. A mixer may be coupled to the reactor and acts to keep the bacterial biomass located in the mixed liquor in suspension.

The secondary clarification tank or membrane system of this embodiment comprises an inlet, a first outlet, and a second outlet, the inlet receiving decontaminated fluid from the second outlet of the reactor. The secondary clarification tank or membrane system acts to retain within the system the bacterial biomass remaining in the decontaminated fluid. The first outlet of the secondary clarification tank or membrane system acts to recycle bacterial biomass back into the reactor and may communicate with reactor second inlet. In another embodiment, a third pump may be coupled to the second inlet of the reactor to facilitate the flow of the recycled bacterial biomass. The second outlet of the secondary clarification tank or membrane system acts to remove purified fluid from the system.

During the operation of this embodiment, untreated fluid enters the fluid inlet and is pumped by the first pump into the pressurized gas transfer reactor. The interior of the pressurized gas transfer reactor is maintained under a pressure higher than atmospheric pressure. Pressurized gas is introduced into the interior of the pressurized gas transfer reactor and is therein dissolved into the untreated fluid. After an adequate amount of gas has been dissolved into the untreated fluid, the untreated fluid is allowed to flow through the outlet of the pressurized gas transfer reactor and into the first inlet of the depressurization shaft.

The second end of the depressurization shaft is maintained at a pressure above atmospheric pressure, but lower than the pressure within the pressurized gas transfer reactor. Superoxygenated fluid enters the second end of the depressurization shaft through the first inlet of the depressurization shaft. Additionally, fluid from the reactor enters the second end of the depressurization shaft through the second inlet of the depressurization shaft. Within the second end of the depressurization shaft, the superoxygenated fluid having a high dissolved gas concentration is mixed and thereby diluted with the fluid from the reactor, which contains a low dissolved gas concentration. The superoxygenated fluid mixture is then allowed to flow up the depressurization shaft and is subjected to a gradual pressure decrease due to the decreasing hydrostatic pressure present as the fluid flows up the depressurization shaft. In the embodiment wherein the interior of the depressurization shaft includes carrier surfaces to which biofilm may adhere, the bacteria comprising the biofilm may begin to consume the contaminants and dissolved gas contained within the superoxygenated fluid mixture as the superoxygenated fluid mixture flows up the depressurization shaft.

The depressurized, superoxygenated fluid mixture then flows into the reactor where it combines with the bacterial biomass contained within the reactor and is further diluted. Once the fluid, gas, and bacteria combine, the mixture is termed "mixed liquor." The bacteria consume the organic contaminants contained within the fluid as well as the gas dissolved therein. After a predetermined amount of time, the mixed liquor is pumped by the second pump through the first outlet of the reactor and recycled back into the second end of the depressurization shaft. Alternatively, the decontaminated fluid is allowed to flow out of the second outlet of the reactor and into the secondary clarification tank or membrane system.

The membrane system or secondary clarification tank acts to remove the bacterial biomass from the purified fluid. The bacterial biomass retained by the secondary clarification tank or membrane system may be recycled back to the reactor through the first outlet of the secondary clarification tank, which communicates with the second inlet of the reactor. The purified fluid exits the system through the second outlet of the secondary clarification tank or membrane system.

In an alternative embodiment of the fluid treatment system, a primary clarification tank is oriented prior to the pressurized gas transfer reactor. The primary clarification tank has a fluid inlet, a partial weir attached to the lower interior side of the tank, a sludge outlet, and a fluid outlet. In this embodiment, the fluid outlet of the primary clarification tank communicates with the inlet of the pressurized gas transfer reactor. Therefore, the untreated fluid flows into the primary clarification tank through the fluid inlet and the solid contaminants located within the untreated fluid are allowed to settle out into the bottom of the primary clarification tank to form sludge. The partial weir acts to block the sludge from flowing through the fluid outlet of the primary clarification tank. The sludge is allowed to flow through the sludge outlet and thereby exit the system. The de-emulsified fluid is pumped by the first pump out of the primary clarification tank fluid outlet and into the pressurized gas transfer reactor as previously described.

In another embodiment of the present invention, the fluid inlet is coupled to the inlet of the pressurized gas transfer reactor. The fluid inlet receives the untreated fluid containing contaminants and the fluid is superoxygenated, as previously described. However, in the second embodiment, the outlet of the pressurized gas transfer reactor communicates directly with the inlet of the reactor. A throttling valve or regenerative turbine may be coupled to the outlet of the pressurized gas transfer reactor to maintain the desired pressure within the pressurized gas transfer reactor.

The reactor is above grade and comprised of two ends, an inlet, and two outlets. The first end of the reactor is positioned above the second end of the reactor. The positioning of the second end of the reactor below the first end of the reactor is to ensure an adequate amount of hydrostatic pressure is maintained therein. In this manner, the reactor of this embodiment also acts to pressurize the pressurized gas transfer reactor and as a depressurization device. The inlet of the reactor communicates with the outlet of the pressurized gas transfer reactor. The first outlet of the reactor communicates with the inlet of the reactor via a recycle line. The first outlet of the reactor allows mixed liquor from within the reactor to flow through the recycle line, where it is mixed with sludge, and recycled back through the system. The recycled mixed liquor/sludge mixture is thereafter combined with the superoxygenated fluid prior to entering the reactor. A second pump may be coupled to the first outlet of the reactor to facilitate the recycling of the mixed liquor.

The second outlet of the reactor may contain a membrane system to retain bacterial biomass within the reactor or communicate with a secondary clarification tank. The secondary clarification tank may be comprised similar to the secondary clarification tank previously described in the previous embodiments. A regenerative turbine may be coupled to the second outlet of the reactor in order to recover a portion of the energy required to pump the fluid into the pressurized gas transfer reactor against the hydrostatic head within the reactor.

During the operation of this embodiment, untreated fluid enters the fluid inlet and is pumped by the first pump into the pressurized gas transfer reactor. Within the pressurized gas transfer reactor, the untreated fluid is superoxygenated as described in the previously mentioned embodiments. The throttling valve or regenerative turbine that may be coupled to the outlet of the pressurized gas transfer reactor acts to maintain the desired back pressure within the pressurized gas transfer reactor. Thereafter, the superoxygenated fluid is allowed to flow through the outlet of the pressurized gas transfer reactor and into the inlet of the reactor.

Within the inlet of the reactor, the superoxygenated fluid is mixed and thereby diluted with the recycled mixed liquor/sludge mixture from the recycle line, which contains a low dissolved gas concentration. The superoxygenated fluid mixture is then allowed to flow into the second end of the reactor and is subjected to a gradual pressure decrease due to the decreasing hydrostatic pressure present as the fluid flows up the reactor. Immobilized bacteria within the reactor acts to decontaminate the fluid mixture as it flows through the reactor. The bacteria consume the organic contaminants contained within the fluid as well as the gas dissolved therein. After a predetermined amount of time, the fluid housed in the reactor is pumped by the second pump through the first outlet of the reactor and recycled back to the inlet of the reactor. Alternatively, the decontaminated fluid is allowed to flow out of the second outlet of the reactor and into the secondary clarification tank or membrane system. The membrane system or secondary clarification tank act to remove the bacterial biomass from the purified fluid and function similarly to the embodiments previously described.

In yet another embodiment of the present invention, the fluid inlet is coupled to the inlet of the pressurized gas transfer reactor. The fluid inlet receives the untreated fluid containing contaminants and the fluid is superoxygenated, as previously described. In this embodiment, the outlet of the pressurized gas transfer reactor communicates with a depressurization and dilution device located within the reactor. In one exemplary embodiment, the depressurization and dilution device comprises a depressurization nozzle and a venturi having an inlet and an outlet, with the depressurization nozzle positioned to discharge directly into the inlet or throat of the venturi. The outlet of the depressurization and dilution device is effectively coupled to the inlet of the reactor. The reactor comprises an open top, a first inlet, a second inlet, and an outlet. As previously stated, the first inlet of the reactor communicates with the outlet of the depressurization and dilution device. The outlet of the reactor may contain a membrane system or may communicate with the inlet of a secondary clarification tank. The second inlet of the reactor may also communicate with the secondary clarification tank. The membrane system and the secondary clarification tank may be comprised similarly to those of the embodiments previously described.

During the operation of this embodiment, untreated fluid enters the fluid inlet and is pumped by the first pump into the pressurized gas transfer reactor. Within the pressurized gas transfer reactor, the untreated fluid is superoxygenated as described in the previously mentioned embodiments. Thereafter, the superoxygenated fluid is allowed to flow through the outlet of the pressurized gas transfer reactor and into the inlet of the depressurization and dilution device. In an exemplary embodiment, the depressurization and dilution device may comprise a depressurization nozzle and a venturi. The depressurization nozzle may be positioned in such a way so that the superoxygenated fluid from the pressurized gas transfer reactor is discharged into the throat of the venturi. This pressurized discharge acts to entrain the fluid housed in the reactor containing a low D.O. concentration through the throat of the venturi. In this manner, the depressurization nozzle and the venturi function to rapidly mix and dilute the superoxygenated fluid with the mixed liquor housed in the reactor, thereby decreasing the incidence of effervescence. The depressurization nozzle also acts to achieve and maintain adequate pressurization of the pressurized gas transfer reactor. It is within the scope of this embodiment for the depressurization and dilution device to comprise more than one depressurization nozzle and more than one dilution enhancing venturi. If more than one depressurization nozzles and venturis are employed, the outlet of the first venturi may act to discharge the superoxygenated fluid/mixed liquor mixture into the throat of a second venturi by way of a second depressurization nozzle, and so on.

The superoxygenated fluid mixture is then allowed to flow into the reactor where the bacterial biomass contained therein consumes the organic contaminants within the fluid as well as the gas dissolved therein. After a predetermined amount of time, the fluid housed in the reactor is allowed to flow through the outlet of the reactor. The outlet of the reactor may contain a membrane system or may communicate with the inlet of a secondary clarification tank. The membrane system acts to retain the bacterial biomass within the reactor and the secondary clarification tank acts to remove the bacterial biomass from the purified fluid. Both the membrane system and the secondary clarification tank of this embodiment function similarly to the embodiments previously described.

The present invention provides a fluid treatment system and method in which minimal energy is consumed in the operation thereof. The invention also provides a system and method wherein a high concentration of gas is dissolved into a fluid under a high pressure and upon the subsequent depressurization of the superoxygenated fluid, the majority of the dissolved gas is maintained in solution, only losing a minimal amount to effervescence. The invention also provides a system that is cost effective to operate and imposes small space requirements to install. Moreover, the invention is also operable with an open-topped tank for the reactor.

These and other features and advantages of this invention will become apparent to those skilled in the art from the following description, claims, and accompanying drawings.

DETAILED DESCRIPTION OF THE INVENTION

The present invention is a system and method for the treatment of fluid, involving the dissolution of a gas into a fluid. For example, the present invention may be used as an oxygenation system, i.e., dissolving oxygen into water.

Referring now to FIG. 1, there is shown a schematic view of a fluid treatment system of a prior art system. As previously discussed, in the embodiment of FIG. 1, prior art system 10 includes system fluid inlet 12, primary clarification tank 14, line 18 for removing sludge from the system, open top reactor 22, gas inlet 24, air bubbling device 26, secondary clarification tank 30, line 32 for recirculating bacterial biomass from secondary clarification tank 30 back to reactor 22, and system outlet 36 for allowing treated fluid to flow out of secondary clarification tank 30, thereby exiting prior art system 10.

For the operation of prior art system 10, fluid flows into primary clarification tank 14, where insoluble contaminants within the fluid are permitted to settle out in bottom 16 to form sludge. The sludge is allowed to flow through line 18 and is thereby removed from system 10. Throttling valve 19 may be coupled to line 18 to control the removal of sludge from system 10. The liquid remaining on top of the sludge is allowed to flow through line 20 to reactor 22 where it is aerated by the introduction of air.

Conventionally, air bubbling device 26 is provided in reactor 22 for purposes of dissolving oxygen into the fluid. Air is introduced into prior art system 10 through inlet 24 and infused into the fluid housed in the reactor by means of air bubbling device 26, which is illustrated in FIG. 1 as a submerged diffuser. Air bubbling device 26 bubbles air up through the fluid housed in reactor 22. An additional known method used to aerate fluid is to splash the contents of open top reactor 22 into the air using a surface aerator. In conventional wastewater treatment systems, such air-infused wastewater would typically contain about 1–2 mg/L of D.O.

The predetermined time of reaction in reactor 22 is dependent upon the rate of oxygen dissolution into the fluid and the bacterial concentration within the reactor. To achieve the desired level of 300 mg/L D.O. using such conventional systems, air must be repeatedly infused into the wastewater over a 4 to 8 hour time period. After the microorganisms present in reactor 22 react with the fluid and dissolved oxygen in reactor 22, the mixed liquor then flows through line 28 to secondary clarification tank 30.

In secondary clarification tank 30, the bacterial biomass remaining in the fluid is removed. The bacterial biomass separated from the decontaminated fluid is allowed to flow through line 32, and recirculated to reactor 22. The clarified fluid flows through line 36 and out of system 10.

Figure 2:
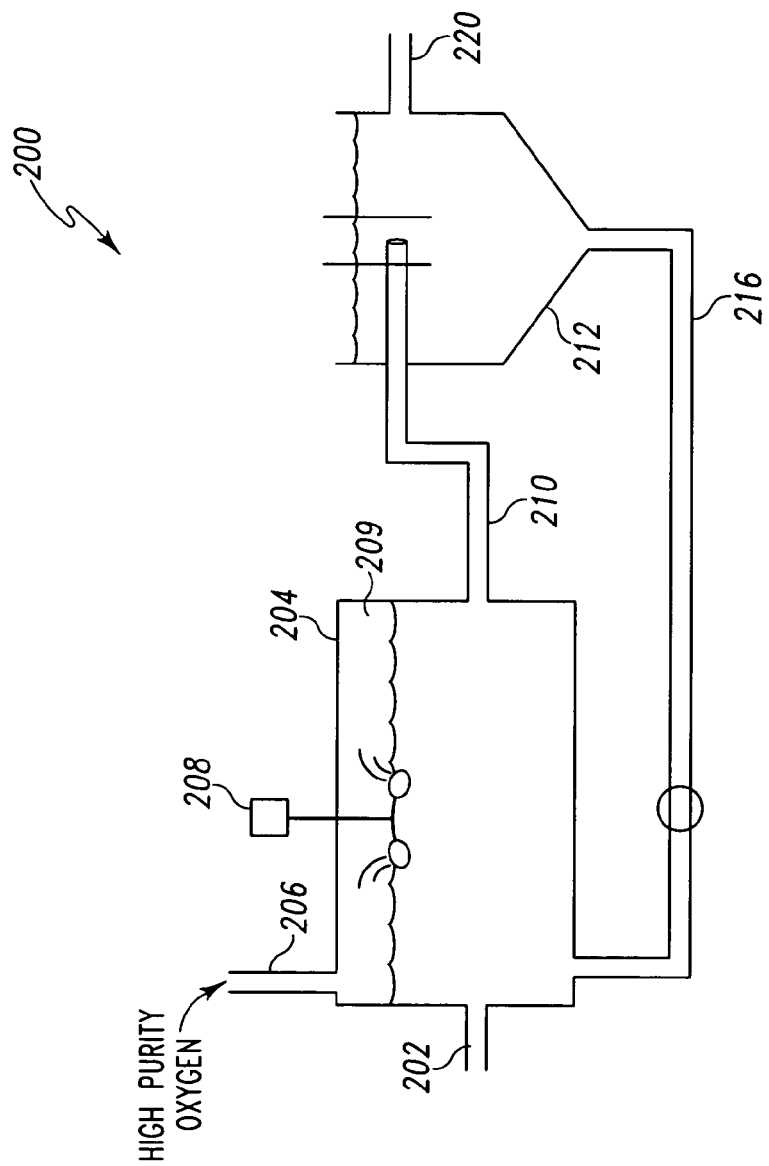
FIG. 2 shows a schematic diagram of another embodiment of a fluid treatment system of the PRIOR ART.

Referring now to FIG. 2, there is shown a schematic view of another embodiment of a fluid treatment system of a prior art system. In the embodiment of FIG. 2, prior art system 200 includes system fluid inlet 202, closed top reactor 204, high purity oxygen inlet 206, surface mixer 208, secondary clarification tank 212, line 216 for recirculating bacterial biomass from secondary clarification tank 212 back to closed top reactor 204, and system outlet 220 for allowing treated fluid to flow out of secondary clarification tank 212, thereby exiting prior art system 200.

For the operation of prior art system 200, fluid flows into closed top reactor 204 wherein high purity oxygen is dissolved into the fluid. High purity oxygen is introduced into prior art system 200 through inlet 206, which injects the high purity oxygen into gas-tight headspace 209. Surface aerator 208 splashes the fluid housed in reactor 204 into gas-tight headspace 209 containing the high purity oxygen. In this manner, the high purity oxygen is dissolved into the fluid and the bacteria located within the reactor can consume the D.O. and the contaminants in the fluid.

Similar to prior art system 10, the amount of time the fluid must remain in reactor 204 to achieve adequate decontamination typically depends upon the rate of D.O. supplementation within the fluid and the bacterial concentration within the reactor. Conventionally, even using high purity oxygen as opposed to air as the oxygen source, to achieve the desired level of 300 mg/L D.O. within the fluid, the fluid must remain in reactor 204 over a 2 to 8 hour period. After the microorganisms present in reactor 204 react with the fluid and D.O. in reactor 204, the mixed liquor then flows through line 210 to secondary clarification tank 212. Secondary clarification tank 212 functions similarly to secondary clarification tank 30 of system 10 as previously described.

Figure 3A:
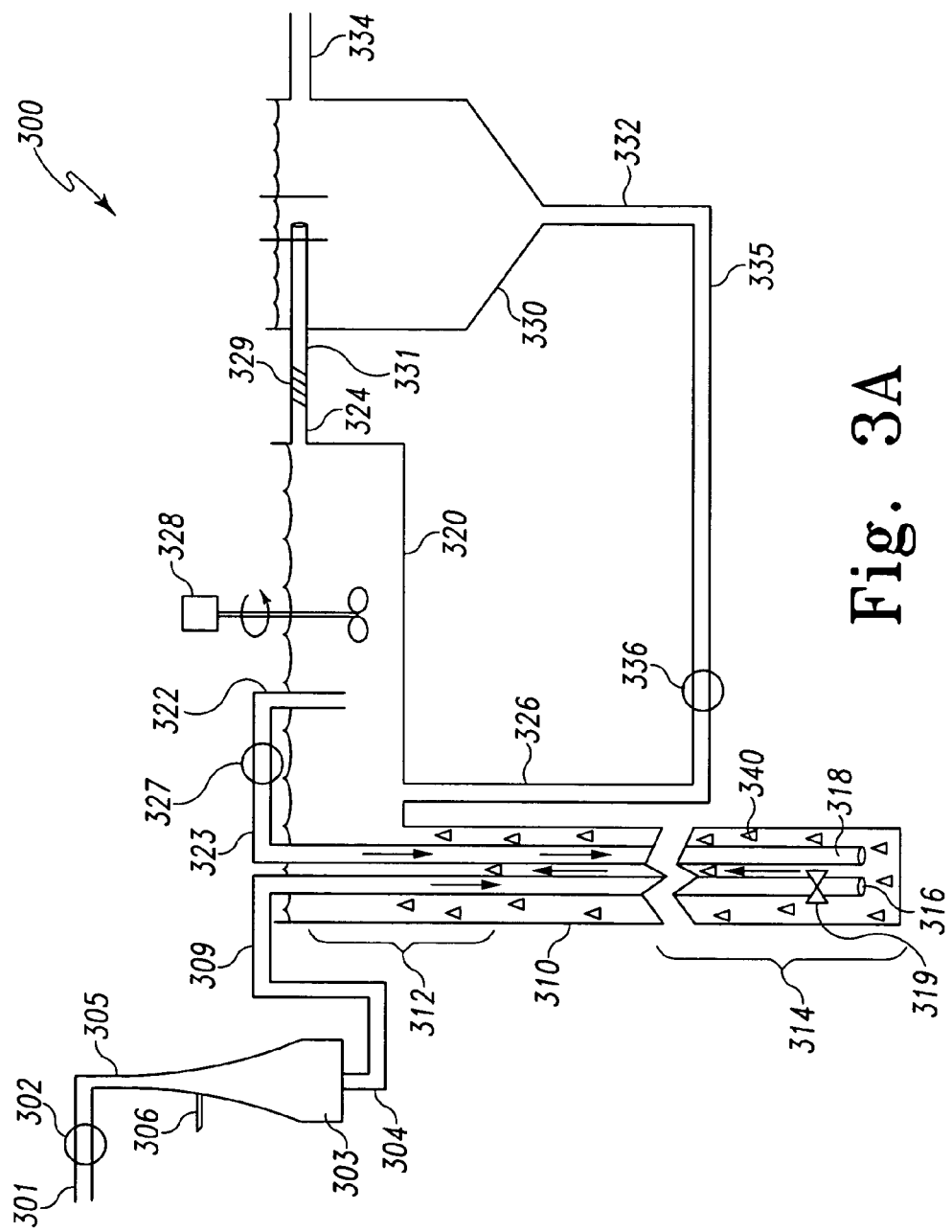
FIG. 3A shows a schematic diagram of one embodiment of a fluid treatment system according to the present invention having a pressurized gas transfer reactor coupled to a depressurization shaft, a reactor, and a secondary clarification tank of the system.

Referring now to FIG. 3A, there is shown a schematic view of one embodiment of a fluid treatment system according to the present invention. In this embodiment, system 300 includes pressurized gas transfer reactor 303 directly coupled to depressurization shaft 310, which is operatively connected to reactor 320. System 300 may also include secondary clarification tank 330, which may be coupled to reactor 320. Similar to the embodiments of FIGS. 1 and 2, system 300 of FIG. 3A may include fluid inlet 301, pump 336, and fluid outlet 334. Instead of a gas inlet for introducing air into the system, system 300 of FIG. 3A includes pressurized gas transfer reactor 303 directly coupled to depressurization shaft 310 by line 304. In addition, reactor 320 of system 300 may be an open top reactor.

First pump 302 is operatively connected to pressurized gas transfer reactor fluid inlet 305 and can be any pumping means that will initiate the flow of fluid through line 301 and into pressurized gas transfer reactor 303 via pressurized gas transfer reactor fluid inlet 305. Pressurized gas transfer reactor 303 is comprised of a gas-tight chamber and includes fluid inlet 305, gas inlet 306, and outlet 304. Pressurized gas transfer reactor 303 may be embodied as a cone shaped pressurized oxygen transfer reactor, the type of which is disclosed in U.S. Pat. No. 6,485,003 to Speece; a U-Tube shaped oxygenator, the type of which is disclosed in U.S. Pat. No. 6,474,627 to Speece; a pressurized loop reactor; a pressurized static mixer; a pressurized venturi; and/or any other pressurized gas transfer reactor well known in the art that is capable of dissolving high purity oxygen into a wastewater fluid in amounts up to about 500 mg/L. Pressurized gas transfer reactor outlet 304 communicates with depressurization shaft first inlet 316.

In this embodiment, depressurization shaft 310 comprises a caisson having a relatively small diameter and a varying depth. The exact specifications of depressurization shaft 310 directly correlate to the amount of fluid to be pumped through system 300 per day. The interior of depressurization shaft 310 may also support carrier surfaces 340 to support a biofilm.

Depressurization shaft 310 consists of first end 312, second end 314, first inlet 316, and second inlet 318. Depressurization shaft first end 312 may be positioned below pressurized gas transfer reactor 303 to facilitate the flow of fluid from pressurized gas transfer reactor 303 to depressurization shaft 310. Depressurization shaft first end 312 may also be positioned level with the bottom of reactor 320. Depressurization shaft second end 314 is positioned below pressurized gas transfer reactor 303, depressurization shaft first end 312, and reactor 320. Depressurization shaft first inlet 316 and depressurization shaft second inlet 318 are both located within depressurization shaft second end 314. Regenerative turbine 319 may be coupled to depressurization shaft first inlet 416 at a location within depressurization shaft second end 314. It is also within the scope of the present invention that a throttling valve may substitute for regenerative turbine 319. The outlet of depressurization shaft 310 is effectively connected to reactor 320. Depressurization shaft 310 may contain carrier surfaces to support a biofilm.

Reactor 320 comprises an open top tank and includes reactor first inlet, reactor second inlet 326, reactor first outlet 322, and reactor second outlet 324. Reactor first inlet is effectively connected to the outlet of depressurization shaft 310. Reactor second inlet 326 is coupled to secondary clarification tank 330 by line 335. Reactor first outlet 322 is connected to depressurization shaft second inlet 318 by recycle line 323. Second pump 327 is operatively connected to reactor first outlet 322 to facilitate the movement of fluid housed in reactor 320 through reactor first outlet 322 and recycle line 323. Reactor second outlet 324 is coupled to secondary clarification tank inlet 331. Surface mixer 328 may be operatively connected to reactor 320 and acts to maintain the bacteria within reactor 320 in suspension. It is within the scope of the present system to include the addition of biofilm carrier surfaces within reactor 320. Membrane system 329 may also be incorporated within reactor second outlet 324 to aid in maintaining the bacteria within reactor 320.

Secondary clarification tank 330 is effectively connected to reactor second outlet 324 and includes inlet 331, first outlet 332, and second outlet 334. Secondary clarification tank first outlet 332 is coupled to reactor second inlet 326 by line 335. Third pump 336 is operatively connected to line 335. Secondary clarification tank second outlet 334 is the outlet through which the clarified fluid exits system 300. It is within the scope of the present system to include membrane system 329 in addition to or in place of secondary clarification tank 330.

Now referring to the operation of system 300 as shown in FIG. 3A, first pump 302 or a plurality of such pumps, operates to pressurize and move untreated fluid into line 301, through pressurized gas transfer reactor inlet 305, and into pressurized gas transfer reactor 303. In this embodiment, pressurized gas transfer reactor 303 is used to dissolve gas into the untreated fluid in a concentration higher than the ambient pressure saturation value of that particular gas in that particular fluid. Pressurized gas is supplied (source not shown) through gas supply inlet 306 into the interior of pressurized gas transfer reactor 303. Pressure is maintained throughout the interior of pressurized gas transfer reactor 303. Maintaining pressurized gas transfer reactor 303 under pressure has the effect of efficiently dissolving large concentrations of the gas into the fluid over a short period of time. For the purposes of this embodiment's application to wastewater treatment, it is preferred to use high purity oxygen as the gas, and wastewater as the fluid into which the high purity oxygen is introduced via pressurized gas transfer reactor 303.

After the fluid is superoxygenated in pressurized gas transfer reactor 303 and contains the desired amount of gas dissolved therein, the superoxygenated fluid flows through pressurized gas transfer reactor outlet 304 and into depressurization shaft second end 314. In order to keep the gas in a dissolved state, it is important to minimize effervescence of the supersaturated fluid after depressurization. In this embodiment, a decrease in effervescent loss is achieved by rapid dilution under hydrostatic pressure.

The superoxygenated fluid enters depressurization shaft second end 314 through depressurization shaft first inlet 316. Within depressurization shaft second end 314, the superoxygenated fluid is subjected to a pressure higher than atmospheric pressure, but lower than the pressure maintained in pressurized gas transfer reactor 303. Due to the placement of depressurization shaft second end 314 relative to pressurized gas transfer reactor 303, reactor 320, and depressurization shaft first end 312, hydrostatic pressure accounts for the increased pressure maintained in depressurization shaft second end 314. It is preferred that the hydrostatic pressure created by the fluid housed in depressurization shaft 310 results in a maintenance pressure of over about 15 psig in depressurization shaft second end 314. The exact specifications of depressurization shaft 310 may be altered to achieve the desired output. For example, for a wastewater flow of 10 million gallons per day, in order to sufficiently dilute and depressurize the superoxygenated fluid to minimize effervescent loss of dissolved gas, the specifications of depressurization shaft 310 would preferably be approximately 4 feet in diameter and approximately 78 feet deep and the recycle flow through recycle line 323 would need to be in excess of 26 million gallons per day. It is within the scope of this invention to alter the diameter and depth of depressurization shaft 310 in order to achieve the desired pressure in depressurization shaft second end 314, depending upon the fluid being decontaminated, the microorganism concentration within the system, and gas requirements of system 300.

Concurrent with the introduction of superoxygenated fluid into depressurization shaft second end 314, recycled mixed liquor from reactor first outlet 322 enters depressurization shaft second end 314 through depressurization shaft second inlet 318. Because of the continual dissolved gas uptake by the microbes located in reactor 320, the dissolved gas concentration in the mixed liquor is maintained at a low level, e.g., <10 mg/L. Thus, in depressurization shaft second end 314, the superoxygenated fluid containing about 300 mg/L dissolved gas and mixed liquor containing a low dissolved gas concentration mix together. The addition of mixed liquor having a low dissolved gas content to the superoxygenated fluid greatly facilitates the dilution of the superoxygenated fluid without effervescent loss of the dissolved gas. With regard to this embodiment as it relates to the treatment of wastewater, it is desired that the ratio of fluid mixture in depressurization shaft second end 314 is about 1 volume of superoxygenated wastewater from depressurization shaft first inlet 316 to about 2.6 volumes of mixed liquor from depressurization shaft second inlet 318. After the fluids mix in depressurization shaft second end 314, the superoxygenated fluid mixture is allowed to flow up depressurization shaft 310, where the fluid mixture is gradually subjected to a corresponding decrease in hydrostatic pressure. This decreasing hydrostatic pressure thereby depressurizes the superoxygenated fluid mixture while minimizing effervescent gas loss. The superoxygenated fluid mixture also may react with the biofilm adhered to carrier surfaces 340 as the fluid mixture flows up depressurization shaft 310. In this manner, bacteria coupled to carrier surfaces 340 may begin to consume the contaminants and gas within the fluid mixture prior to the complete depressurization of the fluid mixture.

When the depressurized, superoxygenated fluid mixture reaches depressurization shaft first end 312, it flows into reactor 320. Reactor 320 is maintained at atmospheric pressure. In reactor 320, the superoxygenated fluid mixture is biologically purified by the removal of organic pollutants in a manner which is known. In other words, reactor 320 contains microorganisms that metabolize the organic wastes contained within the superoxygenated fluid mixture, correspondingly consuming the dissolved oxygen or gas therein.

As previously noted, once the superoxygenated fluid mixture combines with the microorganisms, the fluid is referred to as mixed liquor. Surface mixer 328 acts to maintain the bacteria within reactor 320 in suspension within the mixed liquor. After the mixed liquor has been allowed to react within reactor 320 for the predetermined period of time, the mixed liquor housed in reactor 320 is pumped by second pump 327, or a plurality of such pumps, into reactor first outlet 322 to be recycled back to depressurization shaft second end 314. Alternately, the mixed liquor is allowed to flow through reactor second outlet 324.

In one embodiment of the present invention, reactor second outlet 324 is coupled to secondary clarification tank 330. The decontaminated fluid is allowed to flow into secondary clarification tank 330 wherein the remaining bacterial biomass in the decontaminated fluid are separated out from the purified fluid. The bacterial biomass separated from the fluid exit secondary clarification tank 330 through secondary clarification tank first outlet 332. The bacterial biomass is then recycled back to reactor 320 through line 335. Third pump 336 may be coupled to line 335 and acts to facilitate the movement of the bacterial biomass into reactor 320 through reactor second inlet 326. The purified fluid is then allowed to exit system 300 through secondary clarification tank second outlet 334. In an additional embodiment of the present invention, secondary clarification tank 330 may be replaced or used in addition to membrane system 329. Membrane system 329 acts similarly to secondary clarification tank 330 in that membrane system 329 retains the bacterial biomass in reactor 320 and allows the purified fluid to flow therethrough.

Figure 3B:
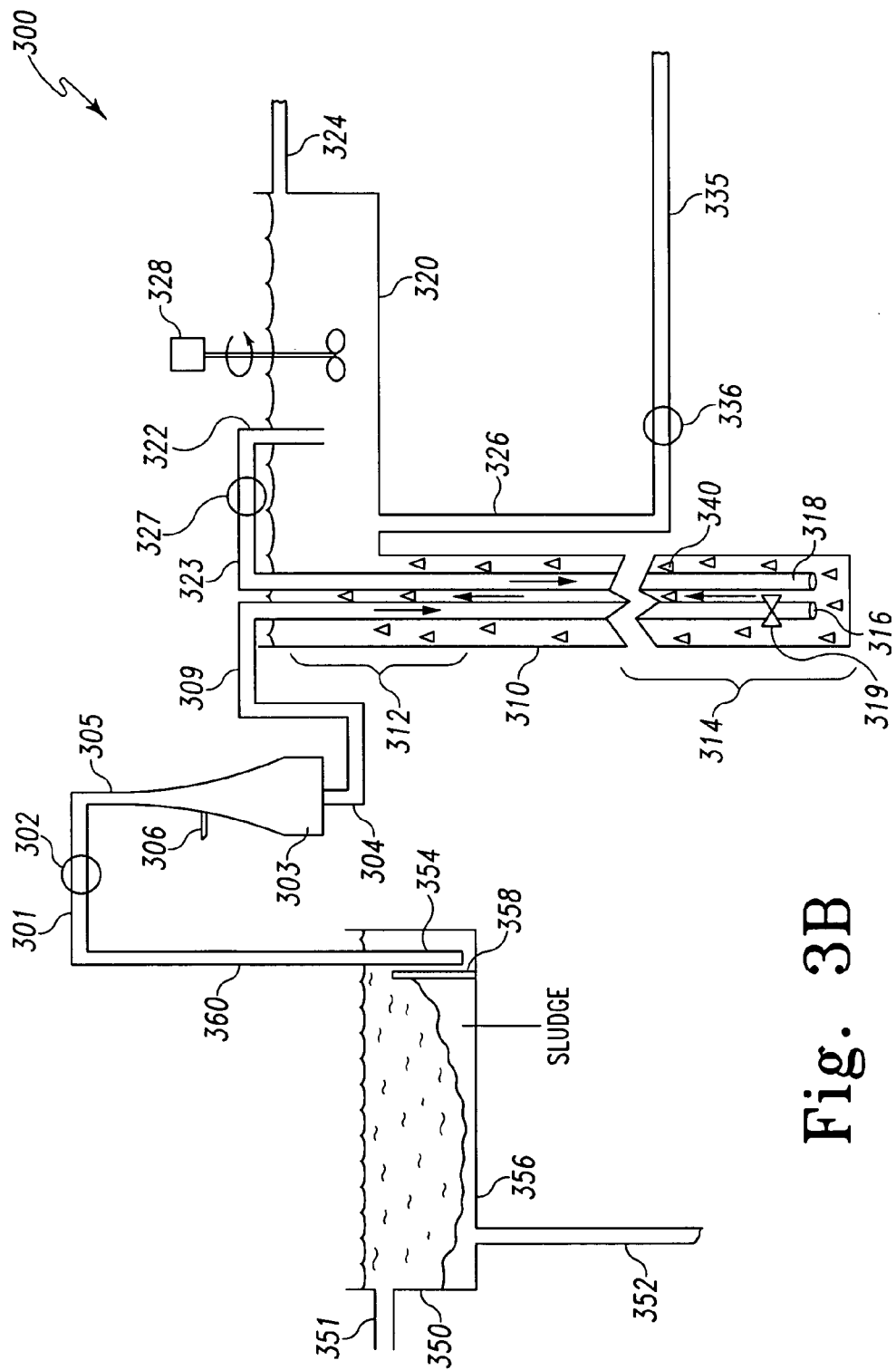
FIG. 3B shows a schematic diagram of one embodiment of the present invention, in which system 300 of FIG. 3A additionally includes a primary clarification tank.

Now referring to system 300 of FIG. 3B, there is shown a schematic view of another embodiment of system 300 according to the present invention. In this embodiment, system 300 includes the addition of primary clarification tank 350. Primary clarification is most effectively used when the untreated fluid contains insoluble contaminants, as it is beneficial to remove solid contaminants so they do not add to the dissolved oxygen demand in reactor 320. Primary clarification tank 350 comprises an open top tank having inlet 351, first outlet 352, second outlet 354, and partial weir 358. In this embodiment, untreated fluid flows through inlet 351 of primary clarification tank 350 and into system 300. Any soluble contaminants are permitted to settle out of the fluid, thereby forming sludge. The sludge flows through primary clarification tank first outlet 352 and is thereby removed from system 300. Partial weir 358 extends from bottom 356 of primary clarification tank 350 and is located proximate to primary clarification tank second outlet 354. Primary clarification tank second outlet 354 allows clarified fluid to flow therethrough and communicates with pressurized gas transfer reactor 303 through line 360.

In primary clarification tank 350, insoluble contaminants in the untreated fluid are permitted to settle out in bottom 356 to form sludge. Partial weir 358 acts to block the sludge from flowing out of primary clarification tank second outlet 354. Thus, partial weir 358 allows the de-emulsified fluid remaining on top of the sludge to flow through primary clarification tank outlet 354 free of the insoluble contaminants previously contained therein. The de-emulsified fluid then is pumped through line 360 by first pump 302 and into pressurized gas transfer reactor 303. The fluid flows through the remainder of system 300 as previously described.

Figure 4:
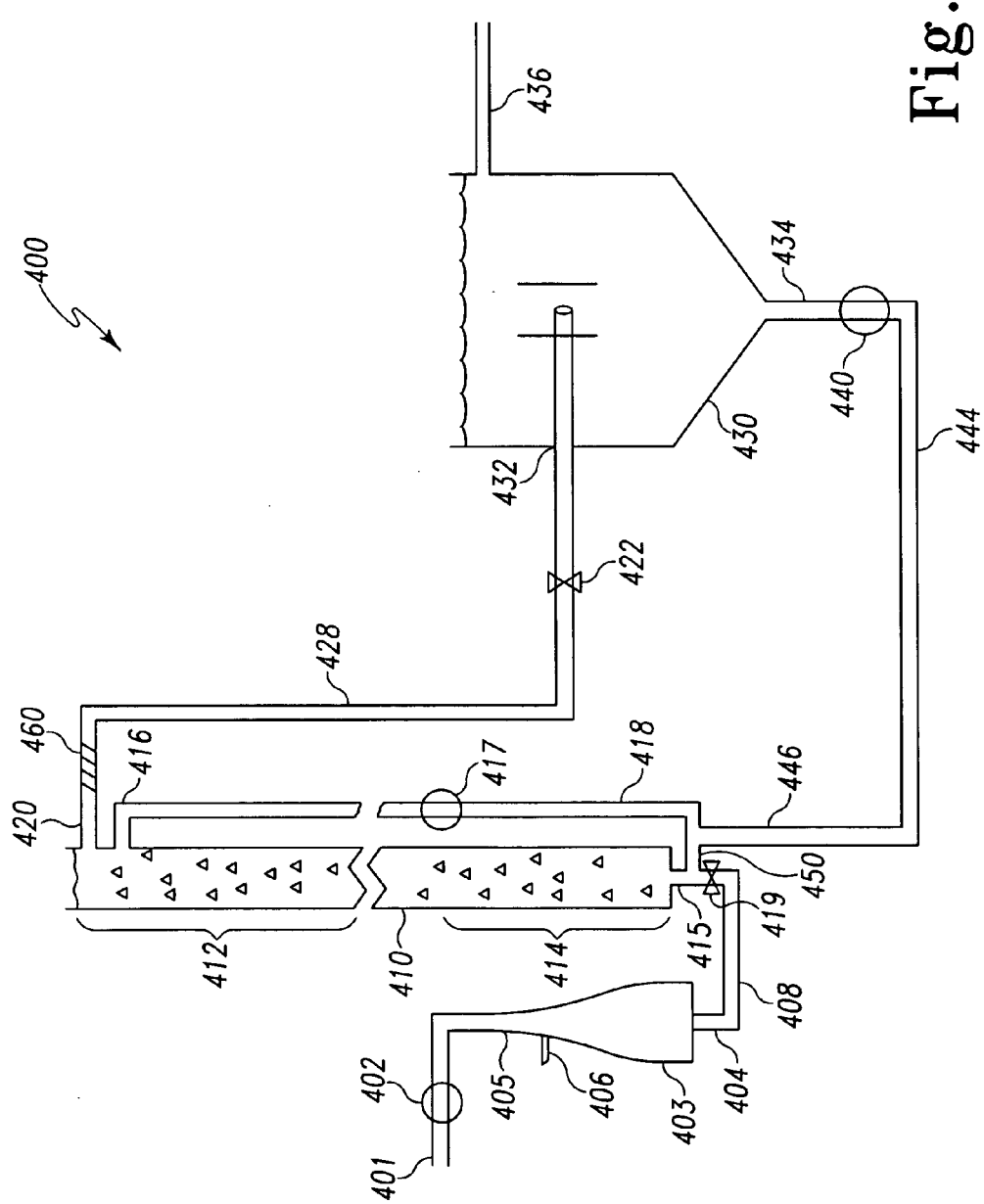
FIG. 4 shows a schematic diagram of a second embodiment of a fluid treatment system according to the present invention having a pressurized gas transfer reactor coupled to a reactor positioned above grade.

Referring now to FIG. 4, there is shown a schematic view of another embodiment of a fluid treatment system according to the present invention. System 400 includes pressurized gas transfer reactor 403 directly coupled to reactor 410, and reactor 410 being operatively connected to secondary clarification tank 430. Similar to the embodiment shown in FIG. 3A, system 400 includes fluid inlet 401, pressurized gas transfer reactor 403, reactor 410, first pump 402, second pump 417, throttling valve 419, and secondary clarification tank 430. System 400 differs from the embodiment shown in FIG. 3A in that reactor 410 is above grade and acts as a depressurization device; therefore, system 400 does not include a separate depressurization shaft.

Untreated fluid enters system 400 through fluid inlet 401. Fluid inlet 401 is operatively connected to pressurized gas transfer reactor 403. First pump 402 may be coupled to fluid inlet 401 and may be any pumping means that will initiate the flow of fluid through fluid inlet 401 and into pressurized gas transfer reactor 403. Pressurized gas transfer reactor 403 is comprised of an air-tight chamber and includes fluid inlet 405, gas inlet 406, and outlet 404. Pressurized gas transfer reactor 403 may be embodied as a cone shaped pressurized oxygen transfer reactor, the type of which is disclosed in U.S. Pat. No. 6,485,003 to Speece; a U-Tube shaped oxygenator, the type of which is disclosed in U.S. Pat. No. 6,474,627 to Speece; a pressurized loop reactor; a pressurized static mixer; a pressurized venturi; and/or any other pressurized gas transfer reactor well known in the art that is capable of dissolving high purity oxygen in a wastewater fluid in amounts up to at least 300 mg/L. Pressurized gas transfer reactor outlet 404 communicates with reactor inlet 415. Throttling valve 419 may be coupled to pressurized gas transfer reactor outlet 404 to aid in controlling the flow of the superoxygenated fluid into reactor 410 and to maintain a specific pressure within pressurized gas transfer reactor 403. In an alternative embodiment of the present invention, a regenerative turbine may be used in place of throttling valve 419 or no such device may be used at all.

Reactor 410 comprises an open top vessel having a relatively small diameter, is positioned above grade, and contains immobilized bacterial biomass. Reactor 410 may range from about 10 feet tall to over 100 feet tall. Reactor 410 is comprised of two ends, and includes inlet 415, first outlet 416, and second outlet 420. Reactor 410 is operatively connected to pressurized gas transfer reactor 403 by way of line 408. First end 412 of reactor 410 is positioned above second end 414 of reactor 410. The positioning of reactor 410 above grade as well as the positioning of reactor first end 412 higher than pressurized gas transfer reactor 403 and reactor second end 414 contributes to the significant amount of hydrostatic pressure within second end 414 of reactor 410. Among other things, this hydrostatic pressure also acts to pressurize pressurized gas transfer reactor 403.

Because of the hydrostatic pressure within second end 414 of reactor 410, system 400 does not require throttling valve 419 to maintain an adequate pressure within pressurized gas transfer reactor 403. However, throttling valve 419, or optionally a regenerative turbine, may be coupled to line 408 if it is desired to maintain a pressure within pressurized gas transfer reactor 403 in excess of the pressure maintained in second end 414 of reactor 410. Including throttling valve 419 or a regenerative turbine within system 400 provides a means to achieve and maintain a higher pressure within pressurized gas transfer reactor 403 than the hydrostatic pressure within second end 414 of reactor 410.

Reactor inlet 415 communicates with reactor second end 414, whereas both reactor first outlet 416 and reactor second outlet 420 are located proximate to reactor first end 412 and communicate therewith. Reactor first outlet 416 is effectively connected to reactor inlet 415 by recycle line 418. Recycle line 418 may comprise two inlets and outlet 450. As previously stated, reactor first outlet 416 communicates with the first inlet of recycle line 418. Recycle line outlet 450 communicates with reactor inlet 415. Recycle line second inlet 446 communicates with secondary clarification tank 430 via line 444. Second pump 417 may be coupled to recycle line 418 and may be used to facilitate the movement of the fluid housed within reactor 410 through recycle line 418. Second pump 417 may be any pumping means that will initiate the flow of fluid through reactor first outlet 416, through recycle line 418, and into reactor inlet 415. Reactor second outlet 420 is effectively connected to secondary clarification tank 430 via line 428, and may contain membrane system 460, which functions to separate out bacterial solids from the flow of decontaminated fluid. Regenerative turbine 422 may be coupled to line 428 and may serve to recover energy from the pressurized discharge of pressurized gas transfer reactor 403, thereby acting to conserve the net energy consumption of system 400.

Secondary clarification tank 430 comprises an open top tank and includes inlet 432, first outlet 434, and second outlet 436. First outlet 434 of secondary clarification tank 430 communicates with recycle line 418 via line 444, and allows bacterial biomass separated out of the decontaminated fluid to be recycled to reactor 410. Pump 440, or a plurality of such pumps, may be coupled to line 444. Pump 440 may be any pump capable of facilitating and/or regulating the flow of recycled biomass through line 444 and into recycle line 418. Second outlet 436 of secondary clarification tank 430 allows purified fluid to flow therethrough, thereby exiting system 400. It is within the scope of the present system to include membrane system 460 in addition to or in place of secondary clarification tank 430 to retain bacterial biomass within reactor 410.

For the operation of system 400 shown in FIG. 4, untreated fluid flows into system 400 through inlet 401. The untreated fluid flows into pressurized gas transfer reactor 403 and is superoxygenated as previously described with reference to system 300 of FIG. 3A. After the fluid is superoxygenated in pressurized gas transfer reactor 403 and contains the desired amount of gas dissolved therein, the superoxygenated fluid flows through pressurized gas transfer reactor outlet 404, through line 408, and into reactor inlet 415.

Concurrent with the introduction of superoxygenated fluid into reactor inlet 415, a mixture of recycled fluid from reactor first outlet 416 and recycled biomass from secondary clarification tank first outlet 434 enters reactor inlet 415 through recycle line outlet 450. Because of the continual dissolved gas uptake by the immobilized bacteria located within reactor 410, the dissolved gas concentration in the recycled fluid mixture is maintained at a low level, e.g., <10 mg/L. Thus, in reactor inlet 415, the superoxygenated fluid containing about 300 mg/L dissolved gas and the recycled fluid mixture from reactor first outlet 416 containing a low dissolved gas concentration mix together. The addition of the recycled fluid mixture having a low dissolved gas concentration to the superoxygenated fluid under pressure greatly facilitates the dilution of the superoxygenated fluid and minimizes effervescent loss of the dissolved gas.

Once the superoxygenated fluid is mixed with the recycled fluid mixture from reactor first end 412 and secondary clarification tank first outlet 434, the superoxygenated fluid mixture is allowed to flow from reactor inlet 415 into reactor 410. Within reactor 410, the immobilized bacteria metabolize the organic wastes contained within the superoxygenated fluid mixture, correspondingly consuming the dissolved oxygen or gas therein. As the superoxygenated fluid mixture flows up reactor 410, from reactor second end 414 to reactor first end 412, the fluid mixture is gradually subjected to a corresponding decrease in hydrostatic pressure. This decreasing hydrostatic pressure thereby depressurizes the superoxygenated fluid mixture while minimizing effervescent gas loss.

Once the fluid housed in reactor 410 reaches the top of reactor first end 412, the fluid is either pumped through reactor first outlet 416 or allowed to flow through reactor second outlet 420. Second pump 417 pulls fluid housed in first end 412 of reactor 410 through reactor first outlet 416 and into recycle line 418. Concurrently, biomass recycled through line 444 from secondary clarification tank first outlet 434 is pumped by pump 440 into recycle line 418. Within recycle line 418, the recycled fluid from reactor first end 412 and the recycled biomass from secondary clarification tank first outlet 434 are mixed, therefore forming a recycled fluid mixture prior to entering reactor inlet 415. This recycled fluid mixture is then allowed to flow into reactor inlet 415 where it is therein mixed with superoxygenated fluid flowing from pressurized gas transfer reactor 403 as previously described. The fluid flowing through second outlet 420 flows through line 428 and into second clarification tank inlet 432.

In secondary clarification tank 430, any remaining bacterial biomass within the decontaminated fluid is separated out as previously described relevant to secondary clarification tank 330 of FIG. 3A. The bacterial biomass that has been separated out of the decontaminated fluid is allowed to flow through secondary clarification tank first outlet 434 and line 444 to be recycled back through reactor 410. The purified fluid is allowed to flow through secondary clarification tank second outlet 436, thereby exiting system 400. It is also within the scope of the present system to include membrane system 460 within line 428 in addition to, or in place of, secondary clarification tank 430.

Figure 5:
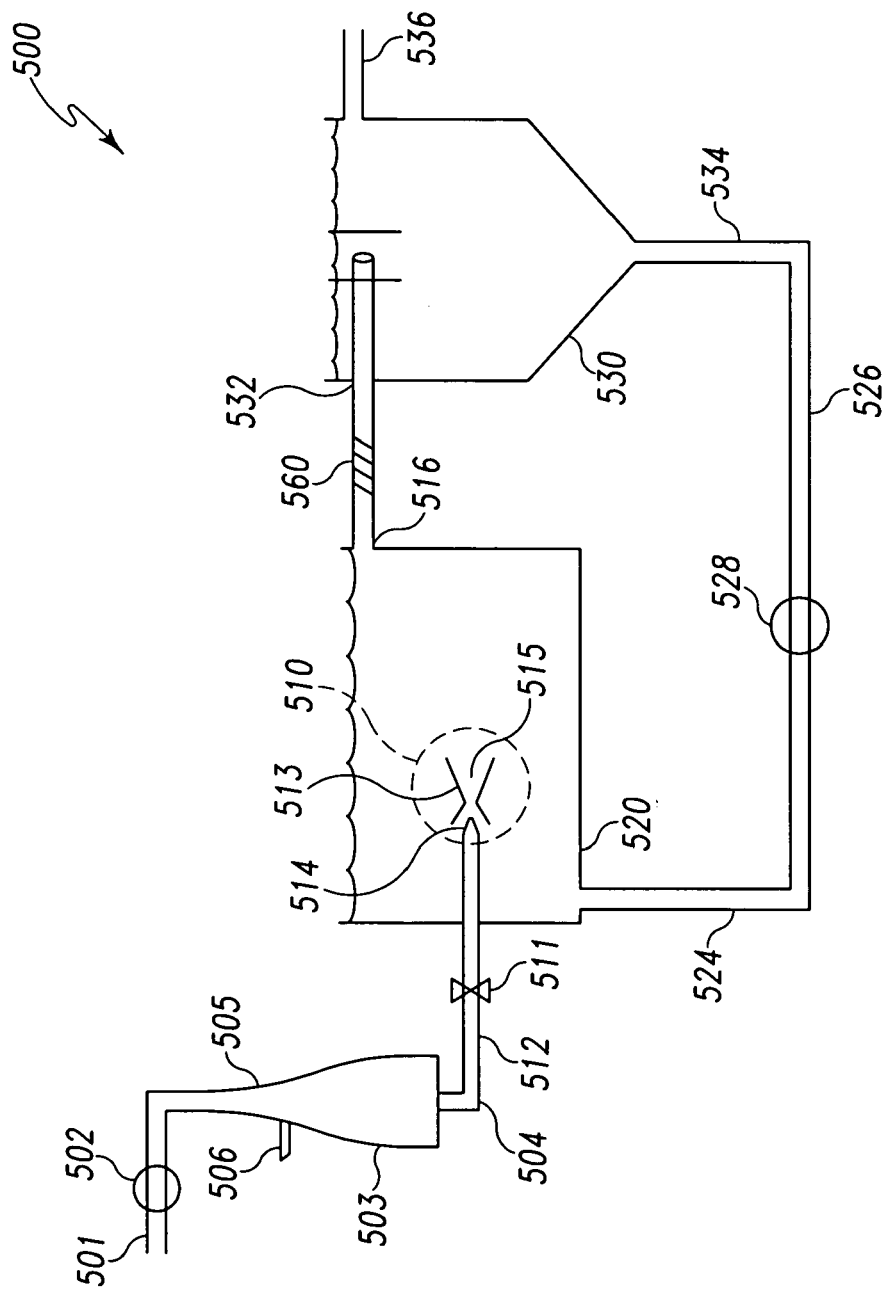
FIG. 5 shows a schematic diagram of a third embodiment of a fluid treatment system according to the present invention having a pressurized gas transfer reactor coupled to a venturi positioned within the reactor, the venturi thereby receiving superoxygenated fluid from the pressurized gas transfer reactor.

Referring now to FIG. 5, there is shown a schematic view of yet another embodiment of a fluid treatment system according to the present invention. System 500 includes pressurized gas transfer reactor 503, depressurization and dilution device 510, reactor 520, and secondary clarification tank 530. System 500 differs from the embodiments of systems 300 and 400 in that system 500 does not rely upon hydrostatic pressure to support the depressurization of superoxygenated fluid flowing through the system.

Untreated fluid enters system 500 through fluid inlet 501. Fluid inlet 501 is operatively connected to pressurized gas transfer reactor 503. First pump 502 may be coupled to fluid inlet 501 and may be any pumping means that will initiate the flow of fluid through fluid inlet 501 and into pressurized gas transfer reactor 503. Similar to pressurized gas transfer reactor 403 of system 400, pressurized gas transfer reactor 503 is comprised of a gas-tight chamber and includes fluid inlet 505, gas inlet 506, and outlet 504. Pressurized gas transfer reactor 503 may be embodied as a cone shaped pressurized oxygen transfer reactor, the type of which is disclosed in U.S. Pat. No. 6,485,003 to Speece; a U-Tube shaped oxygenator, the type of which is disclosed in U.S. Pat. No. 6,474,627 to Speece; a pressurized loop reactor; a pressurized static mixer; a pressurized venturi; and/or any other pressurized gas transfer reactor well known in the art that is capable of dissolving high purity oxygen in a wastewater fluid in amounts up to at least 300 mg/L. Pressurized gas transfer reactor outlet 504 communicates directly with depressurization and dilution device 510 through line 512.

Depressurization and dilution device 510 is located within reactor 520. In the embodiment shown in FIG. 5, depressurization and dilution device 510 comprises depressurization nozzle 514 and venturi 513. In the present embodiment, depressurization nozzle 514 functions as the inlet of depressurization and dilution device 510, and venturi 513 functions as the outlet of depressurization and dilution device 510. It is within the scope of the present invention that depressurization and dilution device 510 may comprise any depressurization and dilution device capable of rapidly diluting and depressurizing the superoxygenated fluid flowing therethrough and is not limited to comprising venturi 513 or depressurization nozzle 514. For example, in an additional embodiment the depressurization and dilution device may employ regenerative turbine 511 in lieu of restriction nozzle 514. As such, regenerative turbine 511 may be coupled to line 512, and may act to restrict the flow of the superoxygenated fluid discharged from outlet 504 of pressurized gas transfer reactor 503. By restricting the flow through line 512, regenerative turbine 511 may act to alter the pressure of the fluid flowing therethrough. Regenerative turbine 511 may be used independently or in conjunction with venturi 513.

Venturi 513 includes an inlet and outlet 515. In the embodiment where depressurization and dilution device 510 comprises depressurization nozzle 514 and venturi 513, the inlet of venturi 513 communicates with depressurization nozzle 514. In an exemplary example, depressurization nozzle 514 may be placed proximate to the throat of venturi 513. Venturi outlet 515 is effectively connected to reactor 520 and directly communicates therewith. It is also within the scope of this embodiment that depressurization nozzle 514 may be used as the sole depressurization and dilution device of system 500, exclusive of venturi 513. Moreover, it is within the scope of this embodiment for depressurization and dilution device 510 to comprise more than one venturi 513, positioned in a manner so that outlet 515 of first venturi 513 communicates with the inlet of the subsequent venturi.

Reactor 520 comprises an open top tank, ranging from about 10 to more than about 20 feet deep, and includes first inlet, second inlet 524, and reactor outlet 516. Reactor first inlet is effectively connected to venturi outlet 515. Reactor second inlet 524 is connected to secondary clarification tank first outlet 534 by line 526. Reactor outlet 516 is connected to secondary clarification tank inlet 532.

Secondary clarification tank 530 is comprised similar to secondary clarification tank 330 of FIG. 3A. Secondary clarification tank 530 comprises an open top and includes inlet 532, first outlet 534, and second outlet 536. First outlet 534 of secondary clarification tank 530 is connected to reactor second inlet 524 through line 526 and conveys bacterial biomass from the decontaminated fluid to be recycled back to reactor 520. Second outlet 536 of secondary clarification tank 530 allows purified fluid to flow therethrough, thereby exiting system 500.

Second pump 528, or a plurality of such pumps, may be coupled to line 526. Second pump 528 may be any pumping means that will initiate the flow of biomass out of secondary clarification tank first outlet 534, through line 526, and into reactor second inlet 524. It is within the scope of the present system to include membrane system 560 within reactor outlet 516 in addition to, or in place of, secondary clarification tank 530.

Now referring to the operation of system 500 shown in FIG. 5, untreated fluid flows into system 500 through inlet 501. The untreated fluid then flows into pressurized gas transfer reactor 503 and is superoxygenated as previously described with reference to system 300 of FIG. 3A. After the fluid is superoxygenated in pressurized gas transfer reactor 503 and contains the desired amount of gas dissolved therein, the superoxygenated fluid flows through pressurized gas transfer reactor outlet 504, through line 512, and into inlet 514 of depressurization and dilution device 510.

In an exemplary example of the present invention, depressurization and dilution device 510 comprises depressurization nozzle 514 and venturi 513. Depressurization and dilution device 510 performs at least two functions: 1. to depressurize the superoxygenated fluid, and 2. to mix and dilute the superoxygenated fluid with the low D.O. fluid within reactor 520. The superoxygenated fluid flowing from pressurized gas transfer reactor 503 flows into the throat of venturi 513 through depressurization nozzle 514. Depressurization nozzle 514 significantly restricts the area through which the superoxygenated fluid is allowed to flow. In addition, first pump 502 pumps against the pressure drop caused by the discharge through depressurization nozzle 514. In this manner, depressurization nozzle inlet 514 and first pump 502 work together to achieve and maintain the desired pressure in pressurized gas transfer reactor 503.

In this embodiment, superoxygenated fluid is discharged through depressurization nozzle 514 into the throat of venturi 513. Because venturi 513 is submerged in the mixed liquor housed in reactor 520, the flow of the superoxygenated fluid through restriction nozzle 514 and into the throat of venturi 513 entrains mixed liquor having a low dissolved oxygen or gas concentration to flow through the throat of venturi 513 as well. Placement of depressurization nozzle 514 proximate to the throat of venturi 513 increases the flow of mixed liquor having a low dissolved gas concentration past depressurization nozzle 514 and through the throat of venturi 513. Therefore, the superoxygenated fluid containing about 300 mg/L dissolved gas concentration and the mixed liquor containing a low dissolved gas concentration both flow through the throat of venturi 513, thereby mixing together. The addition of the mixed liquor having a low dissolved gas content to the superoxygenated fluid under the pressure supplied by depressurization nozzle 514 and the throat of venturi 513 greatly facilitates the rapid dilution of the superoxygenated fluid and minimizes effervescent loss of the dissolved gas. Therefore, a fluid mixture comprised of superoxygenated fluid and mixed liquor flows into reactor 520 through venturi outlet 515.

Consequently, while there is little hydrostatic pressure affecting the superoxygenated fluid entering reactor 520, because the superoxygenated fluid is rapidly diluted to sufficiently low dissolved gas concentrations, the gas remains in a soluble state and little dissolved gas is lost from the fluid through effervescence. Employing smaller nozzles on depressurization nozzle 514 may reduce the amount of time required to achieve adequate dilution of superoxygenated fluid to sub-effervescent concentrations.

Once the fluid mixture has been adequately depressurized and diluted, the bacteria within reactor 520 metabolize the organic wastes contained within the superoxygenated fluid mixture, correspondingly consuming the dissolved oxygen or gas therein as previously described in the operation of system 300 of FIG. 3A. Thereafter, the decontaminated fluid flows through reactor outlet 516 and into secondary clarification tank inlet 532.

In secondary clarification tank 530, any remaining biomass within the decontaminated fluid is separated out as previously described for secondary clarification tank 330 of FIG. 3A. The bacterial biomass that has been separated out of the decontaminated fluid is recycled back to reactor 520 through secondary clarification tank first outlet 534 where it is used again to metabolize the contaminants in the contaminated fluid. Second pump 528 acts to pump the bacterial biomass through secondary clarification tank first outlet 534, through recycle line 526, and into reactor second inlet 524. The purified fluid remaining in secondary clarification tank 530 is allowed to flow through secondary clarification tank second outlet 536, thereby exiting system 500. It is within the scope of the present system to include membrane system 560 within reactor outlet 516 in addition to or in place of secondary clarification tank 530. Membrane system 560 acts to separate the bacterial biomass from the fluid flowing therethrough and subsequently retains the bacterial biomass within reactor 520.

It will be appreciated by those of skill in the art that the present invention offers several improvements over prior art systems. In the present invention's application to wastewater treatment, pressurized gas transfer reactor 303 is capable of achieving the addition of up to 500 mg/L dissolved oxygen into wastewater in a retention time of less than one minute. This amount of dissolved gas is more than sufficient to satisfy the typical aerobic biological processes of the microorganisms located in reactor 320. The ability to greatly increase the amount of gas that can be dissolved into a fluid while concurrently substantially decreasing the amount of time required to perform such a task will be appreciated by those of skill in the art as a significant improvement upon the efficiency of conventional systems. In system 300, only a small amount of mixed liquor is recycled through line 323 in order to dilute the superoxygenated fluid and minimize effervescence. Thus, the pumping requirements of the system are reduced relative to prior art arrangements in which all of the fluid to be treated is passed through bubble contactors, jets, gas blowers, or diffusers.

Moreover, the incorporation of additional surfaces within reactor 320 enables an increase in the concentration of bacteria many times over the conventional concentration of bacteria of 1,000 to 3,000 mg/L. By utilizing this technique, the concentration of bacteria in reactor 320 can be increased to 10,000–30,000 mg/L. Therefore, the time required for the fluid to be decontaminated in reactor 320 is significantly decreased from the requirements of prior art systems.

As this embodiment applies to wastewater, the volume of reactor 320 can be reduced to $\frac{1}{10}$ the size of conventional reactors while remaining functional. This reactor volume reduction is due to the ability of pressurized gas transfer reactor 303 to dissolve high purity oxygen at high concentrations into wastewater and the incorporation of additional surfaces within reactor 320, thereby increasing the bacterial concentration. It will be appreciated by those of skill in the art that such a decrease in reactor volume will be more energy efficient and less space prohibitive than prior art systems.

In the present invention, pressurized gas transfer reactor 303 is maintained at a much higher pressure than depressurization shaft 310 and reactor 320. Therefore, the superoxygenated fluid must be depressurized in order to be distributed in accordance with system 300. If the depressurization of the superoxygenated fluid is performed too rapidly at atmospheric pressure, a portion of the dissolved gas concentration will be lost through effervescence, thus reducing the efficiency of system 300. Effervescence loss is especially costly when high purity oxygen is the dissolved gas. The present invention proposes a scheme for preventing effervescence from the superoxygenated fluid exiting pressurized gas transfer reactor 303. In accordance with the proposed system for fluid treatment, system 300 employs hydrostatic pressure to assist the gradual and controlled depressurization of the superoxygenated fluid flowing from pressurized gas transfer reactor 303 in order to maintain the dissolved gas concentration without significant effervescent loss. Additionally, system 300 mixes the superoxygenated fluid with mixed liquor containing a low dissolved gas content to ensure a more controlled and gradual depressurization. Moreover, the embodiment of system 500 disclosed herein employs rapid depressurization and dilution of the superoxygenated fluid with mixed liquor containing a low dissolved gas content. By employing these means in terms of wastewater treatment, effervescent loss is minimized and an adequate high purity oxygen concentration is retained in the dissolved form necessary for the maintenance of bacterial metabolism (more than 90% of the supersaturated gas can be retained in solution).

The present invention also proposes various schemes for decreasing the net energy consumption of the system. Maintaining low net energy consumption is crucial to achieve effective and economical gas transfer, especially with regards to the use of high purity oxygen in wastewater. Therefore, it is beneficial to incorporate a process whereby a portion of the energy used to pump the fluid into pressurized gas transfer reactor 303 is recovered upon the depressurization of the superoxygenated fluid. This reduction in net energy consumption is accomplished by incorporating into the scope of the present system, as represented in the embodiments shown in FIG. 3A, FIG. 3B, FIG. 4, and FIG. 5, the type of energy recovery device disclosed in U.S. Pat. No. 6,848,258 to Speece. The incorporation of such a device could drive down the energy consumption of the system by as much as 50%. By using this scheme for energy recovery from pressurized gas transfer reactor 303, the high pressures maintained in pressurized gas transfer reactor 303 are energetically and economically feasible. The ability to feasibly dissolve very high concentrations of high purity oxygen, or other gas, into water or other applicable fluid will be appreciated by those skilled in the art as economically efficient and superior to conventional systems.

Finally, the preferred specifications of depressurization shaft 310 for a wastewater flow of 10 million gallons per day are approximately 4 feet in diameter and 78 feet deep. This is a comparatively modest space requirement considering the benefits realized, such as being able to add the totality of the dissolved oxygen requirement to the influent wastewater and avoiding the use of conventional aerators such as gas blowers, jets and diffusers. It will be appreciated by those of skill in the art that the embodiments of this invention entail relatively low capital cost as well as space requirements. Moreover, the present invention operates at a reasonable operating cost. Additionally, most of the flow throughout system 300 is driven by gravitational force.

It will also be still further appreciated that the fluid treatment system of the present invention is comprised of reliable components. The installation, maintenance, and repair costs are also not prohibitive.

For the sake of clarity, the present invention is described using examples pertinent to wastewater and oxygenation; however, the use of the present invention is not limited thereto. For example, other applications include, but are not limited to, the hydrogenation of vegetable oils, hydrogenation of coal liquification, oxygenation for yeast production, Vitamin C production, pharmaceutical and industrial aerobic bioprocesses, chemical oxidation of hydrogen sulfide, and other processes well known in the art.

While the present invention has been described with reference to preferred and exemplary embodiments, it will be understood by those of ordinary skill in the art that various changes may be made and equivalents may be substituted for elements thereof without departing from the scope of the invention. In addition, many modifications may be made to adapt a particular situation or material to the teachings of the invention without departing from the scope thereof. Therefore, it is intended that the invention not be limited to the particular embodiments disclosed, but that the invention include all embodiments falling within the scope of the appended claims.

The invention claimed is:

1. A system for treatment of fluid, the system comprising:
   a. a pressurized gas transfer reactor having an inlet for receipt of the fluid and an outlet, the pressurized gas transfer reactor capable of superoxygenating the fluid received through the inlet, and the outlet allowing superoxygenated fluid to flow therethrough;
   b. a reactor capable of decreasing contaminants in the fluid, the reactor having a first inlet, a second inlet, a first outlet, and a second outlet, the first outlet allowing fluid housed in the reactor to flow therethrough and the second outlet allowing decontaminated fluid to flow therethrough; and
   c. a depressurization shaft having a first and second end, and having a first inlet, a second inlet, and an outlet disposed proximate to the first end of the depressurization shaft, the first inlet for receipt of superoxygenated fluid from the outlet of the pressurized gas transfer reactor, the second inlet operatively connected to the first outlet of the reactor, and the outlet operatively connected to the inlet of the reactor, the depressurization shaft positioned such that the first end is level with the bottom of the reactor and the second end is below the bottom of the reactor.

2. The fluid treatment system of claim 1, wherein the pressurized gas transfer reactor is selected from the group consisting of a cone shaped oxygenator, a U-Tube shaped oxygenator, a pressurized loop reactor, a pressurized static mixer, and a venturi.

3. The fluid treatment system of claim 1, wherein the pressurized gas transfer reactor comprises a means for dissolving high purity oxygen in a wastewater fluid in amounts up to about 500 mg/L.

4. The fluid treatment system of claim 1, wherein the reactor contains additional biofilm carrier surfaces onto which bacteria can adhere.

5. The fluid treatment system of claim 1, wherein the depressurization shaft contains additional biofilm carrier surfaces onto which bacteria can adhere.

6. The fluid treatment system of claim 1, wherein the depressurization shaft is at least about 6 inches in diameter and more than about 20 feet deep.

7. The fluid treatment system of claim 1, wherein the reactor comprises an open top tank.

8. The fluid treatment system of claim 1, further comprising a secondary clarification tank capable of clarifying the fluid flowing therethrough by removing a biomass from the fluid, the secondary clarification tank having an inlet, a first outlet, and a second outlet, the inlet communicating with the second outlet of the reactor and receiving decontaminated fluid therefrom, the first outlet operatively connected to the second inlet of the reactor and allowing the biomass to be recycled theretrough, and the second outlet allowing clarified fluid to flow therethrough.

9. The fluid treatment system of claim 8, wherein a pump is operatively connected to the first outlet of the secondary clarification tank.

10. The fluid treatment system of claim 8, further comprising a primary clarification tank capable of clarifying the fluid flowing therethrough by removing the solid contaminants from the fluid and thereby de-emulsifying the fluid, the primary clarification tank having an inlet for receipt of fluid, a partial weir attached to the lower interior side of the primary clarification tank, and an outlet allowing the de-emulsified fluid to flow therethrough, the outlet being operatively connected to the inlet of the pressurized gas transfer reactor.

11. The fluid treatment system of claim 8, further comprising a membrane system capable of clarifying the fluid flowing therethrough by removing the biomass from the fluid and retaining that biomass within the reactor, the membrane system having an inlet and an outlet, the inlet communicating with the second outlet of the reactor and for receipt of decontaminated fluid containing biomass from the reactor, and the outlet to allow the clarified fluid to flow therethrough.

12. The fluid treatment system of claim 11, further comprising a primary clarification tank capable of clarifying the fluid flowing therethrough by removing the solid contaminants from the fluid, the primary clarification tank having an inlet for receipt of fluid, a partial weir attached to the lower interior side of the primary clarification tank, and an outlet allowing the de-emulsified fluid to flow therethrough, the outlet being operatively connected to the inlet of the pressurized gas transfer reactor.

13. The fluid treatment system of claim 1, wherein a pump is operatively connected to the fluid inlet of the pressurized gas transfer reactor.

14. The fluid treatment system of claim 1, wherein a throttling valve is operatively connected to the first inlet of the depressurization shaft.

15. The fluid treatment system of claim 1, wherein a regenerative turbine is operatively connected to the first inlet of the depressurization shaft.

16. The fluid treatment system of claim 1, wherein a pump is operatively connected to the first outlet of the reactor.

17. The fluid treatment system of claim 1, wherein a first pump is operatively connected to the fluid inlet of the pressurized gas transfer reactor and a second pump is operatively connected to the first outlet of the reactor.

18. The fluid treatment system of claim 17, wherein a regenerative turbine is operatively connected to the first inlet of the depressurization shaft.

19. The fluid treatment system of claim 17, wherein a throttling valve is operatively connected to the first inlet of the depressurization shaft.

20. The fluid treatment system of claim 1, wherein a mixer is operatively coupled to the reactor.

21. The fluid treatment system of claim 1, further comprising a primary clarification tank capable of clarifying the fluid flowing therethrough by removing the solid contaminants from the fluid, the primary clarification tank having an inlet for receipt of fluid, a partial weir attached to the lower interior side of the primary clarification tank, and an outlet allowing the de-emulsified fluid to flow therethrough, the outlet being operatively connected to the inlet of the pressurized gas transfer reactor.

22. The fluid treatment system of claim 1, further comprising a membrane system capable of clarifying the fluid flowing therethrough by removing the biomass from the fluid and retaining that biomass within the reactor, the membrane system having an inlet and an outlet, the inlet communicating with the second outlet of the reactor and for receipt of decontaminated fluid containing biomass from the reactor, and the outlet to allow the clarified fluid to flow therethrough.

23. A system for treatment of fluid, the system comprising:
   a. a pressurized gas transfer reactor having an inlet for receipt of the fluid and an outlet, the pressurized gas transfer reactor capable of superoxygenating the fluid received through the inlet, and the outlet allowing superoxygenated fluid to flow therethrough;
   b. a reactor capable of maintaining hydrostatic pressure therein and decreasing contaminants in the fluid, the reactor being above grade and having an inlet, a first outlet, a second outlet, and a recycle line, the inlet communicating with the outlet of the pressurized gas transfer reactor, the first outlet communicating with the inlet of the reactor via the recycle line and allowing fluid housed in the reactor to be recycled therethrough, and the second outlet allowing decontaminated fluid to flow therethrough; and
   c. a clarification device for the receipt of decontaminated fluid containing biomass, capable of clarifying the decontaminated fluid by separating the decontaminated fluid from the biomass therein, and having an inlet and at least one outlet, the inlet communicating with the second outlet of the reactor and the at least one outlet allowing clarified fluid to flow therethrough.

24. The fluid treatment system of claim 23, wherein the clarification device comprises a secondary clarification tank capable of clarifying the fluid flowing therethrough by removing the biomass from the fluid, the secondary clarification tank having an inlet, a first outlet, and a second outlet, the inlet communicating with the second outlet of the reactor and receiving decontaminated fluid therefrom, the first outlet operatively connected to the second inlet of the reactor and allowing biomass to flow therethrough, and the second outlet allowing clarified fluid to flow therethrough.

25. The fluid treatment system of claim 24, wherein the clarification device further comprises a membrane system capable of clarifying the fluid flowing therethrough by removing the biomass from the fluid and retaining that biomass within the reactor, the membrane system having an inlet and an outlet, the inlet communicating with the second outlet of the reactor and for receipt of decontaminated fluid containing biomass from the reactor, and the outlet to allow the clarified fluid to flow therethrough.

26. The fluid treatment system of claim 24, wherein a pump is operatively connected to the fluid inlet of the pressurized gas transfer reactor.

27. The fluid treatment system of claim 26, wherein a pump is operatively connected to the first outlet of the reactor.

28. The fluid treatment system of claim 27, wherein a regenerative turbine is operatively connected to the inlet of the clarification tank.

29. The fluid treatment system of claim 27, wherein a regenerative turbine is operatively connected to the inlet of the clarification tank.

30. The fluid treatment system of claim 24, wherein the first outlet of the clarification tank communicates with the recycle line of the reactor.

31. The fluid treatment system of claim 30, wherein a pump is operatively coupled to the first outlet of the clarification tank.

32. The fluid treatment system of claim 23, wherein the clarification device comprises a membrane system capable of clarifying the fluid flowing therethrough by removing the biomass from the fluid and retaining that biomass within the reactor, the membrane system having an inlet and an outlet, the inlet communicating with the second outlet of the reactor and for receipt of decontaminated fluid containing biomass from the reactor, and the outlet to allow the clarified fluid to flow therethrough.

33. The fluid treatment system of claim 23, wherein the pressurized gas transfer reactor is selected from the group consisting of a cone shaped oxygenator, a U-Tube shaped oxygenator, a pressurized loop reactor, a pressurized static mixer, and a venturi.

34. The fluid treatment system of claim 23, wherein the pressurized gas transfer reactor comprises a means for dissolving high purity oxygen in a wastewater fluid in amounts up to about 500 mg/L.

35. The fluid treatment system of claim 34, wherein a throttling valve is operatively connected to the outlet of the pressurized gas transfer reactor.

36. The fluid treatment system of claim 23, wherein the reactor is at least about 6 inches in diameter and ranging from about 20 feet to over about 100 feet in height.

37. The fluid treatment system of claim 23, wherein the reactor comprises an open top tank.

38. The fluid treatment system of claim 23, wherein the reactor contains additional surfaces onto which bacteria can adhere.

39. The fluid treatment system of claim 23, wherein the reactor contains immobilized bacteria.

40. The fluid treatment system of claim 23, wherein a pump is operatively connected to the fluid inlet of the pressurized gas transfer reactor.

41. The fluid treatment system of claim 40, wherein a pump is operatively connected to the first outlet of the reactor.

42. The fluid treatment system of claim 23, further comprising a primary clarification tank capable of clarifying the fluid flowing therethrough by removing the solid contaminants from the fluid, the primary clarification tank having an inlet for receipt of fluid, a partial weir attached to the lower interior side of the primary clarification tank, and an outlet allowing the de-emulsified fluid to flow therethrough, the outlet being operatively connected to the inlet of the pressurized gas transfer reactor.

43. A system for treatment of fluid, the system comprising:
  a. a pressurized gas transfer reactor having an inlet for receipt of the fluid and an outlet, the pressurized gas transfer reactor capable of superoxygenating the fluid received through the inlet, and the outlet allowing superoxygenated fluid to flow therethrough;
  b. a depressurization and dilution device capable of depressurizing and diluting the fluid flowing therethrough, the depressurization and dilution device having an inlet and an outlet, the inlet receiving superoxygenated fluid from the outlet of the pressurized gas transfer reactor and the outlet allowing depressurized and diluted fluid to flow therethrough;
  c. a reactor capable of decreasing contaminants in the fluid, the reactor containing biomass and having a first inlet, a second inlet, and an outlet, the first inlet receiving the depressurized and diluted fluid from the outlet of the depressurization and dilution device, the second inlet receiving recycled biomass, and the outlet allowing the decontaminated fluid to flow therethrough; and
  d. a clarification device for receiving decontaminated fluid containing biomass and being capable of separating the decontaminated fluid from the remaining biomass therein, thereby clarifying the fluid, the clarification device having an inlet and at least one outlet, the inlet communicating with the second outlet of the reactor and receiving decontaminated fluid therefrom, and at least one of the at least one outlets allowing clarified fluid to flow therethrough.

44. The fluid treatment system of claim 43, the clarification device being comprised of a secondary clarification tank capable of clarifying the fluid flowing therethrough by removing the biomass from the fluid, the secondary clarification tank having an inlet, a first outlet, and a second outlet, the inlet being operatively connected to the outlet of the reactor, the first outlet allowing the clarified fluid to flow therethrough, and the second outlet being operatively connected to the second inlet of the reactor and allowing the biomass to be recycled therethrough.

45. The fluid treatment system of claim 44, further comprising a primary clarification tank capable of clarifying the fluid flowing therethrough by removing the solid contaminants from the fluid, the primary clarification tank having an inlet for receipt of fluid, a partial weir attached to the lower interior side of the primary clarification tank, and an outlet allowing the de-emulsified fluid to flow therethrough, the outlet being operatively connected to the inlet of the pressurized gas transfer reactor.

46. The fluid treatment system of claim 45, wherein the clarification device further comprises a membrane system capable of clarifying the fluid flowing therethrough by removing the biomass from the fluid and retaining that biomass within the reactor, the membrane system having an inlet and an outlet, the inlet communicating with the second outlet of the reactor and for receipt of decontaminated fluid containing biomass from the reactor, and the outlet to allow the clarified fluid to flow therethrough.

47. The fluid treatment system of claim 43, wherein the pressurized gas transfer reactor is selected from the group consisting of a cone shaped oxygenator, a U-Tube shaped oxygenator, a pressurized loop reactor, a pressurized static mixer, and a venturi.

48. The fluid treatment system of claim 43, wherein the pressurized gas transfer reactor comprises a means for dissolving high purity oxygen in a wastewater fluid in amounts up to about 500 mg/L.

49. The fluid treatment system of claim 43, wherein the reactor is less than about 200 feet deep.

50. The fluid treatment system of claim 43, wherein the reactor contains additional surfaces onto which bacteria can adhere.

51. The fluid treatment system of claim 43, wherein the depressurization and dilution device comprises a depressurization nozzle.

52. The fluid treatment system of claim 51, wherein the depressurization and dilution device further comprises a venturi.

53. The fluid treatment system of claim 51, wherein the depressurization and dilution device further comprises more than one depressurization nozzle and more than one venturi positioned in sequence with each other.

54. The fluid treatment system of claim 43, wherein the depressurization and dilution device comprises a regenerative turbine coupled to the outlet of the pressurized gas transfer reactor.

55. The fluid treatment system of claim 54, wherein the depressurization and dilution device further comprises a venturi.

56. The fluid treatment system of claim 43, wherein a pump is operatively connected to the fluid inlet of the pressurized gas transfer reactor.

57. The fluid treatment system of claim 56, wherein a pump is operatively coupled to the second inlet of the reactor.

58. The fluid treatment system of claim 43, wherein a pump is operatively coupled to the second inlet of the reactor.

59. The fluid treatment system of claim 43, further comprising a primary clarification tank capable of clarifying the fluid flowing therethrough by removing the solid contaminants from the fluid, the primary clarification tank having an inlet for receipt of fluid, a partial weir attached to the lower interior side of the primary clarification tank, and an outlet allowing the de-emulsified fluid to flow therethrough, the outlet being operatively connected to the inlet of the pressurized gas transfer reactor.

60. The fluid treatment system of claim 43, wherein the clarification device comprises a membrane system capable of clarifying the fluid flowing therethrough by removing the biomass from the fluid and retaining that biomass within the reactor, the membrane system having an inlet and an outlet, the inlet communicating with the second outlet of the reactor and for receipt of decontaminated fluid containing biomass from the reactor, and the outlet to allow the clarified fluid to flow therethrough.

61. A method of fluid treatment comprising the steps of:
  a. a system for treatment of fluid, the system comprising:
    1. a pressurized gas transfer reactor having an inlet for receipt of the fluid and an outlet, the pressurized gas transfer reactor capable of superoxygenating the fluid received through the inlet, and the outlet allowing superoxygenated fluid to flow therethrough;
2. a depressurization and dilution device capable of depressurizing and diluting the superoxygenated fluid, the depressurization and dilution device having at least one inlet, and at least one outlet, one of the at least one inlets communicating with the pressurized gas transfer reactor and receiving fluid therefrom, and one of the at least one outlets allowing the depressurized and diluted superoxygenated fluid mixture to flow therethrough;
3. a reactor capable of decreasing contaminants in the fluid, the reactor having at least one inlet and at least one outlet, at least one of the at least one inlets communicating with the depressurization and dilution device and allowing superoxygenated fluid to flow therethrough, and at least one of the at least one outlets being operatively connected to the inlet of a clarification device and allowing decontaminated fluid to flow therethrough; and
4. a clarification device capable of clarifying the fluid by separating the decontaminated fluid from the biomass therein, the clarification device having an inlet and at least one outlet, the inlet receiving decontaminated fluid from the reactor, and one of the at least one outlets allowing clarified fluid to flow therethrough;

b. introducing fluid to be treated into the inlet of the pressurized gas transfer reactor wherein the fluid is superoxygenated;

c. allowing the superoxygenated fluid to flow through the outlet of the pressurized gas transfer reactor to the at least one inlet of the depressurization and dilution device, wherein the fluid is depressurized and diluted;

d. allowing the depressurized and diluted superoxygenated fluid to flow into the reactor wherein the depressurized and diluted superoxygenated fluid and the reactor contents are allowed to mix;

e. allowing the fluid mixture to react with the bacteria within the reactor;

f. allowing the decontaminated fluid to flow out of the at least one outlet of the reactor; and g. allowing the decontaminated fluid to flow into the clarification device wherein the remaining biomass within the decontaminated fluid is removed, thereby producing clarified fluid.

62. The fluid treatment method of claim 61, further comprising allowing the fluid to flow through a primary clarification tank capable of clarifying the fluid flowing therethrough by removing the insoluble contaminants from the fluid, and thereafter allowing the fluid to flow into the inlet of the pressurized gas transfer reactor.

63. The fluid treatment method of claim 61, wherein the fluid comprises wastewater and the gas comprises high purity oxygen.

64. The fluid treatment method of claim 61, wherein the ratio of fluid mixture in the second end of the depressurization and dilution device equals about 1 volume of superoxygenated fluid to about 10 volumes of fluid having a dissolved gas concentration lower than the concentration of dissolved gas of the superoxygenated fluid.

* * * * *